US012613119B2

(12) United States Patent
Loos et al.

(10) Patent No.: US 12,613,119 B2
(45) Date of Patent: *Apr. 28, 2026

(54) ULTRASONIC MASS FUEL FLOW METER

(71) Applicant: Woodward, Inc., Fort Collins, CO (US)

(72) Inventors: Jordan Loren Loos, Rockford, IL (US); Gregory Warren Pulley, Loveland, CO (US); Brian Lynn Swope, Janesville, WI (US)

(73) Assignee: Woodward, Inc., Fort Collins, CO (US)

( * ) Notice: Subject to any disclaimer, the term of this patent is extended or adjusted under 35 U.S.C. 154(b) by 535 days.

This patent is subject to a terminal disclaimer.

(21) Appl. No.: 17/822,538

(22) Filed: Aug. 26, 2022

(65) Prior Publication Data

US 2023/0066926 A1 Mar. 2, 2023

Related U.S. Application Data

(60) Provisional application No. 63/237,763, filed on Aug. 27, 2021.

(51) Int. Cl.
G01F 1/66 (2022.01)
G01F 1/667 (2022.01)
(Continued)

(52) U.S. Cl.
CPC .............. G01F 1/662 (2013.01); G01F 1/667 (2013.01); G01F 1/668 (2013.01); G01F 1/78 (2013.01); G01F 1/86 (2013.01)

(58) Field of Classification Search
CPC . G01F 1/662; G01F 1/78; G01F 1/667; G01F 1/668; G01F 1/86
See application file for complete search history.

(56) References Cited

U.S. PATENT DOCUMENTS 3,218,852 A 11/1965 Scarpa et al.
3,575,050 A 4/1971 Lynnworth
(Continued)

FOREIGN PATENT DOCUMENTS

CN 205642485 10/2016
DE 3116333 11/1982
(Continued)

OTHER PUBLICATIONS

PCT International Search Report and Written Opinion in International Appln. No. PCT/US2022/075579, mailed on Dec. 23, 2022, 15 pages.
(Continued)

*Primary Examiner* — Helen C Kwok
(74) *Attorney, Agent, or Firm* — Reinhart Boerner Van Deuren P.C.

(57) ABSTRACT

The subject matter of this specification can be embodied in, among other things, a method of sensing that includes measuring an acoustic impedance of a fluid, measuring a first time of flight in a first direction through the fluid, measuring a second time of flight in a second direction through the fluid, determining a mass fluid flow rate based on the measured acoustic impedance, the measured first time of flight, and the measured second time of flight, and providing the determined mass fluid flow rate.

14 Claims, 12 Drawing Sheets

(51) Int. Cl.

| | |
|---|---|
| *G01F 1/78* | (2006.01) |
| *G01F 1/86* | (2006.01) |

(56) References Cited

U.S. PATENT DOCUMENTS

| | | | | |
|---|---|---|---|---|
| 3,925,692 | A * | 12/1975 | Leschek | B06B 1/0685 |
| | | | | 310/346 |
| 4,157,482 | A | 6/1979 | Kakinuma | |
| 4,297,608 | A | 10/1981 | Jensen | |
| 4,308,745 | A | 1/1982 | Lisitsa et al. | |
| 4,320,659 | A * | 3/1982 | Lynnworth | G01H 15/00 |
| | | | | 73/290 V |
| 4,345,657 | A | 8/1982 | Mig | |
| 4,754,645 | A | 7/1988 | Piche et al. | |
| 5,464,039 | A | 11/1995 | Bergamini | |
| 5,750,892 | A | 5/1998 | Huang | |
| 6,005,395 | A | 12/1999 | Chan et al. | |
| 6,651,484 | B2 | 11/2003 | Fiebelkorn et al. | |
| 7,051,765 | B1 | 5/2006 | Kelley et al. | |
| 7,464,611 | B2 | 12/2008 | Matter | |
| 7,600,417 | B2 | 10/2009 | Paradise | |
| 7,954,387 | B1 | 6/2011 | Furlong et al. | |
| 8,181,536 | B2 | 5/2012 | Augenstein et al. | |
| 8,584,531 | B2 | 11/2013 | Liao et al. | |
| 8,756,990 | B2 | 6/2014 | Speldrich | |
| 8,950,436 | B2 | 2/2015 | Chalupa et al. | |
| 8,959,913 | B2 | 2/2015 | Nagurney et al. | |
| 9,057,391 | B2 | 6/2015 | Sawchuk et al. | |
| 9,182,259 | B2 | 11/2015 | Suzuki | |
| 9,187,974 | B2 | 11/2015 | Coonrod et al. | |
| 9,239,337 | B2 | 1/2016 | Mueller | |
| 9,261,389 | B2 | 2/2016 | Gill | |
| 9,267,833 | B2 | 2/2016 | Ohmiya | |
| 9,297,680 | B2 | 3/2016 | Maruyama et al. | |
| 9,605,695 | B2 | 3/2017 | Sawchuk et al. | |
| 9,702,855 | B2 | 7/2017 | Han et al. | |
| 9,759,591 | B2 | 9/2017 | Pearson et al. | |
| 9,891,085 | B2 | 2/2018 | Muhammad et al. | |
| 10,126,762 | B2 | 11/2018 | Loos et al. | |
| 10,208,555 | B2 | 2/2019 | Gottlieb et al. | |
| 10,309,432 | B2 | 6/2019 | Reckner et al. | |
| 11,181,406 | B2 * | 11/2021 | Loos | G01F 1/78 |
| 11,307,069 | B2 | 4/2022 | Loos | |
| 11,650,087 | B2 | 5/2023 | Davey et al. | |
| 11,668,818 | B2 | 6/2023 | Loos et al. | |
| 11,885,655 | B2 | 1/2024 | Loos et al. | |
| 12,140,669 | B2 | 11/2024 | Pulley et al. | |
| 2002/0195246 | A1 | 12/2002 | Davidson | |
| 2004/0007079 | A1 * | 1/2004 | Wilda | G01F 1/662 |
| | | | | 73/861.29 |
| 2004/0093957 | A1 * | 5/2004 | Buess | G01F 1/662 |
| | | | | 73/861.27 |
| 2004/0123672 | A1 | 7/2004 | Wang | |
| 2005/0016281 | A1 | 1/2005 | Hill et al. | |
| 2005/0189108 | A1 | 9/2005 | Davidson | |
| 2007/0125826 | A1 | 6/2007 | Shelton, IV | |
| 2007/0227263 | A1 | 10/2007 | Fukano | |
| 2007/0233412 | A1 | 10/2007 | Gotoh | |
| 2008/0294144 | A1 | 11/2008 | Leo et al. | |
| 2010/0050455 | A1 | 3/2010 | Siraky | |
| 2010/0192703 | A1 * | 8/2010 | Huang | G01F 1/66 |
| | | | | 73/861.28 |
| 2011/0022335 | A1 | 1/2011 | Foucault et al. | |
| 2011/0042938 | A1 | 2/2011 | Gallagher et al. | |
| 2011/0271769 | A1 * | 11/2011 | Kippersund | G01F 1/86 |
| | | | | 73/861.28 |
| 2012/0073687 | A1 | 3/2012 | Hanson et al. | |
| 2012/0188842 | A1 | 7/2012 | Smith | |
| 2012/0247223 | A1 | 10/2012 | Sawchuk et al. | |
| 2012/0312522 | A1 | 12/2012 | Quin et al. | |
| 2013/0205892 | A1 | 8/2013 | Ueda | |
| 2014/0086017 | A1 | 3/2014 | Nakano et al. | |
| 2014/0138567 | A1 | 5/2014 | Coull | |
| 2014/0198822 | A1 | 7/2014 | Lei et al. | |
| 2014/0260513 | A1 | 9/2014 | Smirnov et al. | |

| | | | | |
|---|---|---|---|---|
| 2014/0260667 | A1 | 9/2014 | Berkcan | |
| 2014/0311253 | A1 | 10/2014 | Iwasa | |
| 2015/0013472 | A1 | 1/2015 | Gill et al. | |
| 2015/0082913 | A1 * | 3/2015 | Maruyama | G01F 1/66 |
| | | | | 73/861.28 |
| 2015/0160053 | A1 | 6/2015 | Baumoel | |
| 2016/0061629 | A1 * | 3/2016 | Han | G01N 29/28 |
| | | | | 73/658 |
| 2016/0258798 | A1 | 9/2016 | Muhammad et al. | |
| 2017/0102364 | A1 | 4/2017 | Hill et al. | |
| 2017/0350741 | A1 | 12/2017 | Marshall | |
| 2018/0051973 | A1 | 2/2018 | Schrubbe | |
| 2018/0058202 | A1 | 3/2018 | Disko et al. | |
| 2018/0058209 | A1 | 3/2018 | Song et al. | |
| 2018/0306625 | A1 | 10/2018 | Baker | |
| 2019/0154026 | A1 | 5/2019 | Kamen et al. | |
| 2019/0250022 | A1 | 8/2019 | Gagne et al. | |
| 2020/0041375 | A1 | 2/2020 | Bowdle | |
| 2020/0103263 | A1 * | 4/2020 | Ploss | G01F 1/712 |
| 2020/0173569 | A1 | 6/2020 | Koch et al. | |
| 2021/0164816 | A1 * | 6/2021 | Loos | G01F 1/78 |
| 2021/0278262 | A1 * | 9/2021 | Loos | G01F 1/66 |
| 2022/0034695 | A1 * | 2/2022 | Loos | G01F 1/667 |
| 2022/0042835 | A1 | 2/2022 | Loos | |
| 2022/0042836 | A1 | 2/2022 | Loos | |
| 2022/0043142 | A1 | 2/2022 | Loos | |
| 2022/0214452 | A1 | 7/2022 | Pulley et al. | |
| 2022/0299349 | A1 | 9/2022 | Loos et al. | |
| 2022/0323995 | A1 | 10/2022 | Gyde et al. | |
| 2024/0085229 | A1 | 3/2024 | Loos et al. | |
| 2024/0337517 | A1 | 10/2024 | Loos et al. | |

FOREIGN PATENT DOCUMENTS

| | | | | |
|---|---|---|---|---|
| DE | 19710296 | 3/1998 | | |
| DE | 29916826 | 11/2000 | | |
| DE | 102013224819 | 6/2015 | | |
| DE | 102014205042 | 9/2015 | | |
| DE | 102016105338 | 9/2017 | | |
| DE | 202017007116 | 8/2019 | | |
| EP | 0249689 | 12/1987 | | |
| EP | 0451355 | 10/1991 | | |
| EP | 0907069 | 4/1999 | | |
| EP | 1188935 | 3/2002 | | |
| EP | 1279368 | 1/2003 | | |
| EP | 0890826 | 11/2009 | | |
| EP | 2232342 | 9/2010 | | |
| EP | 2824429 | 1/2015 | | |
| EP | 2827111 | 1/2015 | | |
| EP | 3222980 | 9/2017 | | |
| GB | 2259571 | 3/1993 | | |
| GB | 2321705 | 8/1998 | | |
| GB | 2336681 | 10/1999 | | |
| JP | 2006337059 | 12/2006 | | |
| JP | 2010261872 | 11/2010 | | |
| WO | WO1992005042 | 4/1992 | | |
| WO | WO 2004010087 | 1/2004 | | |
| WO | WO2005040732 | 5/2005 | | |
| WO | WO2009071746 | 6/2009 | | |
| WO | WO2016033534 | 3/2016 | | |
| WO | WO2020157707 | 8/2020 | | |
| WO | WO2021040540 | 3/2021 | | |
| WO | WO2021113444 | 6/2021 | | |
| WO | WO-2021113444 A1 * | 6/2021 | | G01F 1/662 |

OTHER PUBLICATIONS

PCT International Preliminary Report on Patentability in International Appln. No. PCT/US2021/045047, dated Sep. 28, 2023, 13 pages.

International Search Report and Written Opinion in International Appln. No. PCT/US2023/016039, mailed on Jul. 3, 2023, 15 pages.

Flowconditioner.com [online], "Flow Conditioners," Canada Pipeline Accessories, Jun. 2021, retrieved on Dec. 14, 2022, retrieved from URL <https://www.flowconditioner.com/flow-conditioner/>, 6 pages.

(56)  References Cited

OTHER PUBLICATIONS

NASA.gov [online], "Balanced Flow Meters without Moving Parts," NASA Technical Reports Server, Jan. 2008, retrieved on Dec. 14, 2022, retrieved from URL <https://ntrs.nasa.gov/citations/20090020619>, 2 pages.

NASA.gov [online], "NASA Tech Briefs, Jan. 2008," NASA Technical Reports Server, Jan. 2008, retrieved on Dec. 14, 2022, retrieved from URL <https://ntrs.nasa.gov/archive/nasa/casi.ntrs.nasa.gov/20090020593.pdf>, 43 pages.

No Author Listed, "ASME PTC 19.May 2004—Flow Measurement—Performance Test Codes," The American Society of Mechanical Engineers, Jul. 2005, 184 pages.

PIProcessinstrumentation.com [online], "Improving flow measurement accuracy with flow conditioners," Jan. 12, 2017, retrieved on Dec. 14, 2022, retrieved from URL <https://www.piprocessinstrumentation.com/home/article/15563560/improving-flow-measurement-accuracy-with-flow-conditioners>, 11 pages.

Sanderson et al., "Guidelines for the Use of Ultrasonic Non-Invasive Metering Techniques," Flow Measurement and Instrumentation, 2002, 13(4):125-142.

Stoof et al., "Contributing to Economic Upstream Gas Metering with a Dual-Path Ultrasonic Flow Metering Solution," SICK AG, Oct. 2018, 20 pages.

Wateronline.com [online], "QCT Series In-Line Ultrasonic Flow Meters for Low Viscosity Liquid Applications," Jun. 2021, retrieved on Dec. 14, 2022, retrieved from URL <https://www.wateronline.com/doc/qct-series-in-line-ultrasonic-flow-meters-for-low-viscosity-liquid-applications-0001>, 1 page.

Hoche et al., "Ultrasound-Based Density Determination via Buffer Rod Techniques", J. Sens. Syst., 2013, 2:103-125.

Kazys et al., "Ultrasonic Technique for Density Measurement of Liquids in Extreme Conditions", Sensors, 2015, 15:19393-19415.

Nakamura, "Ultrasonic Transducers: Materials and Design for Sensors, Actuators and Medical Applications", Woodhead Publishing, 2012.

PCT International Preliminary Report on Patentability in International Appln. No. PCT/US2020/063013, dated Feb. 21, 2022, 12 pages.

PCT International Search Report and Written Opinion in International Appln. No. PCT/US2020/063013, dated May 11, 2021, 21 pages.

PCT International Search Report and Written Opinion in International Appln. No. PCT/US2021/021103, dated Jun. 16, 2021, 14 pages.

PCT International Search Report and Written Opinion in International Appln. No. PCT/US2021/045040, dated Nov. 16, 2021, 15 pages.

PCT International Search Report and Written Opinion in International Appln. No. PCT/US2021/045042, dated Nov. 19, 2021, 6 pages.

PCT International Search Report and Written Opinion in International Appln. No. PCT/US2021/045047, dated Mar. 1, 2022, 21 pages.

PCT International Search Report and Written Opinion in International Appln. No. PCT/US2021/045049, dated Nov. 16, 2021, 6 pages.

PCT Invitation to Pay Additional Fees, and, Where Applicable, Protest Fee in International Appln. No. PCT/US2020/063013, dated Mar. 19, 2021, 16 pages.

PCT Invitation to Pay Additional Fees, and, Where Applicable, Protest Fee in International Appln. No. PCT/US2021/045047, dated Nov. 19, 2021, 14 pages.

Puttmer et al., "Ultrasonic Density Sensor for Liquids", IEEE Transactions on Ultrasonics, Ferroelectrics, and Frequency Control, Jan. 2000, 47(1):85-92.

International Preliminary Report on Patentability in International Application No. PCT/US2021/045040, mailed on Feb. 16, 2023, 9 pages.

International Preliminary Report on Patentability in International Application No. PCT/US2021/045042, mailed on Feb. 16, 2023, 10 pages.

International Preliminary Report on Patentability in International Application No. PCT/US2021/045049, mailed on Feb. 16, 2023, 10 pages.

Communication Pursuant to Article 94(3) EPC in European Patent Application No. 23151677.4, dated Mar. 19, 2024, 5 pages.

International Preliminary Report on Patentability in International Application No. PCT/US2022/075579, mailed on Mar. 7, 2024, 8 pages.

Communication Pursuant to Article 94(3) EPC in European Patent Application No. 21714749.5, dated Sep. 21, 2023, 7 pages.

Communication Pursuant to Article 94(3) EPC in European Patent Application No. 21714749.5, dated Apr. 26, 2024, 6 pages.

European Search Report in European Application No. EP 23151677.4, dated Apr. 3, 2023, 7 pages.

International Preliminary Report on Patentability in International Application No. PCT/US2023/016039, mailed on Oct. 10, 2024, 9 pages.

* cited by examiner

*1100*

Measure An Acoustic Impedance of A Fluid
*1110*

Measure First Time of Flight Through The Fluid
*1120*

Measure Second Time of Flight Through The Fluid
*1130*

Determine A Mass Fluid Flow Rate Based on Measured Acoustic Impedance, First Time of Flight, and Second Time of Flight    *1140*

Provide Determined Mass Fluid Flow Rate
*1150*

ULTRASONIC MASS FUEL FLOW METER

CROSS-REFERENCE TO RELATED PATENT APPLICATIONS

This application claims the benefit of U.S. Provisional Application No. 63/237,763, filed Aug. 27, 2021, the contents of which are incorporated by reference herein.

TECHNICAL FIELD

This instant specification relates to ultrasonic fluid mass flow sensors.

BACKGROUND

Fluid measurement devices are used for the characterization and operation of fluid control systems. As the dynamic bandwidths, flow ranges, accuracies, and reliabilities of flow measurement devices improve, the potential application landscape of such devices broadens. High dynamic bandwidth flow meters can be used as control system feedback sensors for improving steady state and/or transient accuracy in fuel systems. Ultrasonic flow meters (USFM) are a proven industrial technology that can be leveraged for implementation to aircraft turbine systems.

Existing time of flight ultrasonic flow meters are used in the racing and automotive industries, pipeline custody transfer, industrial flow measurement, and many other applications. However, many of these applications encompass steady-state flow conditions, and their respective applications allow for volumetric flow measurement. In other applications, such as aircraft gas turbine engine applications, the fluid environmental conditions of the fuel delivery system imposes significant design challenges.

SUMMARY

In general, this document describes ultrasonic fluid mass flow sensors.

In an example embodiment, a sensor system includes a fluid housing defining a fluid flow conduit having a first fluid housing portion defining a first axial fluid housing cavity and having a first fluid port in fluidic communication with the first axial fluid housing cavity, a second fluid housing portion defining a second axial fluid housing cavity and having a second fluid port in fluidic communication with the second axial fluid housing cavity, and a tubular fluid conduit in fluidic communication with the first fluid port at a first end and in fluidic communication with the second fluid port at a second end opposite the first end, and defining a conduit axis, a first transceiver element arranged within the first axial fluid housing cavity, axially aligned with the conduit axis, a second transceiver element arranged within the second axial fluid housing cavity, axially aligned with the conduit axis, and a fluid acoustic impedance sensor arranged in fluidic communication with the fluid flow conduit.

Various embodiments can have some, all, or none of the following features. The sensor system can include circuitry configured to activate the first transceiver element to emit a first incident wave though a fluid in the tubular fluid conduit activate the second transceiver element to emit a second incident wave through the fluid in the tubular fluid conduit measure, by the fluid acoustic impedance sensor, an acoustic impedance of the fluid detect, by the second transceiver element, at least a first portion of the first incident wave, determine a first time of flight of the first portion, detect, by the first transceiver element, at least a second portion of the second incident wave, determine a second time of flight of the second portion, and determine a mass fluid flow rate based on the measured acoustic impedance, the determined first time of flight, and the determined second time of flight. The fluid acoustic impedance sensor can include an acoustic transceiver element, and measuring the acoustic impedance of the fluid can include activating, by the circuitry, the acoustic transceiver element to emit an acoustic incident wave, detecting, by the acoustic transceiver element, a first acoustic echo of the acoustic incident wave, detecting, by the acoustic transceiver element, a second acoustic echo of the acoustic incident wave, and comparing, by the circuitry, the first acoustic echo and the second acoustic echo to determine the acoustic impedance of the fluid. The fluid acoustic impedance sensor can include a sensor housing having an interior surface defining a sensor axis and an axial interior sensor housing cavity having a first axial sensor housing portion having a first cross-sectional area perpendicular to the sensor axis, a second axial sensor housing portion arranged adjacent to the first axial sensor housing portion along the sensor axis and having a second cross-sectional area larger than the first cross-sectional area perpendicular to the sensor axis, and a face extending from the interior surface of the first axial sensor housing portion to the interior surface of the second axial sensor housing portion, a first axial buffer rod arranged within the first axial sensor housing portion and having a first axial end and a second axial end, a second axial buffer rod arranged within the second axial sensor housing portion and abutting the face, and having a third axial end and a fourth axial end, and an acoustic transceiver element acoustically mated to the second axial end and the third axial end. The acoustic transceiver element can be configured to emit a vibration having a predetermined wavelength ($\lambda$), and the first axial buffer rod and the second axial buffer rod both can have axial lengths of about a round multiple of n/2 $\lambda$. The acoustic transceiver element can include a piezo element. The sensor system can include a matching layer affixed to the fourth axial end and having a thickness of about an odd multiple of 1/4 $\lambda$. The first axial end can define an acoustic reflector. The first axial end can be abutted to a gas or an at least partial vacuum. The fluid acoustic impedance sensor can include a sensor housing having an interior surface defining a sensor axis and an axial interior sensor housing cavity having a first axial sensor housing portion having a first cross-sectional area perpendicular to the sensor axis, a second axial sensor housing portion arranged adjacent to the first axial sensor housing portion along the sensor axis and having a second cross-sectional area larger than the first cross-sectional area perpendicular to the sensor axis, and a face extending from the interior surface of the first axial sensor housing portion to the interior surface of the second axial sensor housing portion, a buffer rod having a first axial end and a second axial end opposite the first axial end and having a first axial buffer portion arranged within the first axial sensor housing portion and including the first axial end, a second axial buffer portion arranged within the second axial sensor housing portion and abutting the face, and including the second axial end, and a third axial buffer portion, extending axially between the first axial buffer portion and the second axial buffer portion, and having a third cross-sectional area, smaller than the first cross-sectional area, perpendicular to the sensor axis, a cavity defined between the interior surface and the third axial buffer portion, and an acoustic transceiver element acoustically mated to the first end. The acoustic transceiver element can be configured to emit a vibration having a predetermined wavelength (λ), and the buffer rod can have an axial length of about a round multiple of n/2 λ. The third cross-sectional area can be about half as large as the first cross-sectional area. The acoustic transceiver element can include a piezo element. The sensor system can include a matching layer affixed to the second end and having a thickness of about (2n−1) λ/4, where n>0. The sensor system can include a backing abutted to the acoustic transceiver element axially opposite the first end.

In an example implementation, a method of sensing includes measuring an acoustic impedance of a fluid, measuring a first time of flight in a first direction through the fluid, measuring a second time of flight in a second direction through the fluid, determining a mass fluid flow rate based on the measured acoustic impedance, the measured first time of flight, and the measured second time of flight, and providing the determined mass fluid flow rate.

Various implementations can include some, all, or none of the following features. Measuring the acoustic impedance of a fluid can include activating an emitter to emit at least a first incident wave in a first direction and emit a second incident wave in a second direction opposite the first direction, transmitting the first incident wave along a first buffer rod having a first axial end abutted to the emitter and a second axial end opposite the first axial end, transmitting the second incident wave along a second buffer rod having a third axial end abutted to the emitter and a fourth axial end opposite the third axial end and abutted to the fluid, reflecting a first echo of the first incident wave by an acoustic reflector defined along a portion of the second axial end, detecting, by a sensor, the first echo, determining a first amplitude of the first echo, reflecting a second echo of the second incident wave by the fourth axial end, detecting, by the sensor, the second echo, determining a second amplitude of the second echo, and determining a reflection coefficient based on the first amplitude and the second amplitude. One or both of the emitter and the sensor can be piezo elements. A piezo element can include the emitter and the sensor. The acoustic reflector can include a matching layer affixed to the second axial end and having a thickness of about (2n−1) λ/4, where n>0. The fourth axial end can be abutted to a gas or an at least partial vacuum. Measuring the acoustic impedance of a fluid can include activating an emitter to emit at least one incident wave, transmitting the incident wave along a buffer rod having a first axial end abutted to the emitter and a second axial end opposite the first axial end, reflecting a first echo of the incident wave by a gap defined along a portion of the buffer rod, detecting, by a sensor, the first echo, determining a first amplitude of the first echo, reflecting a second echo of the incident wave by the second axial end, detecting the second echo, determining a second amplitude of the second echo, and determining a reflection coefficient based on the first amplitude and the second amplitude. One or both of the emitter and the sensor can be piezo elements. A piezo element can include the emitter and the sensor. The mass fluid flow rate can be given by the equation:

$$\dot{m}_{fluid} = \left(\frac{V_{fluid}}{C_{fluid}}\right) \times C_d \times A \times Z_{fluid} = \left(\frac{t_{up} - t_{dn}}{t_{up} + t_{dn}}\right) \times C_d \times A \times Z_{fluid}.$$

The systems and techniques described here may provide one or more of the following advantages. First, a system can provide improved environmental survivability against wide fluid temperature ranges. Second, the system can provide improved environmental survivability against wide fluid pressure ranges. Third, the system can provide improved environmental survivability against harsh fluids. Fourth, the system can provide integral fluid density sensing. Fifth, the system can be relatively unaffected by fluid flow dynamics (e.g., swirl, vortices, instability). Sixth, the system can be used with update rates of 100 Hz or greater, while maintaining accuracy.

The details of one or more implementations are set forth in the accompanying drawings and the description below. Other features and advantages will be apparent from the description and drawings, and from the claims.

DETAILED DESCRIPTION

Figure 1:
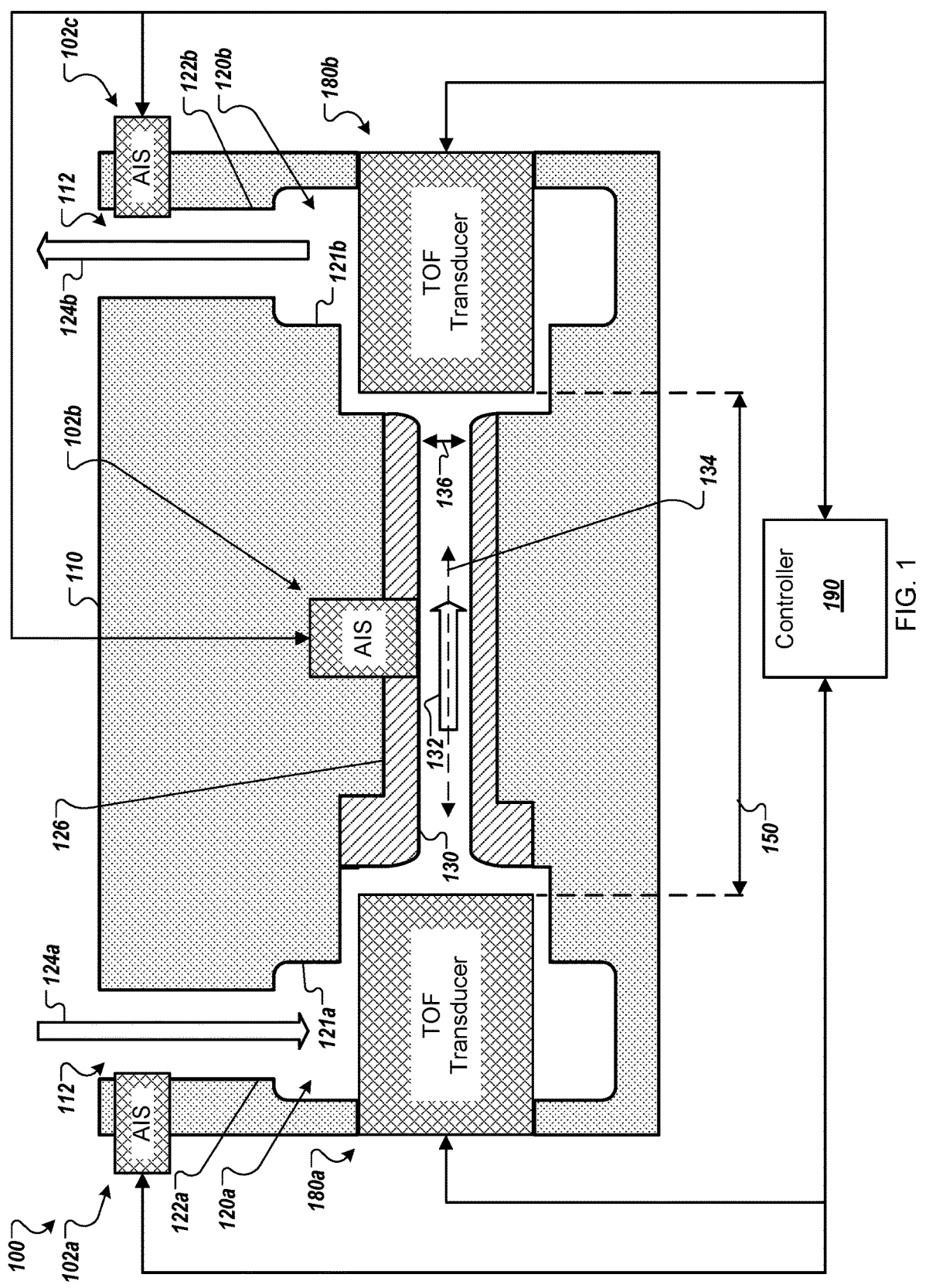
FIG. 1 is a cross-sectional diagram of an example ultrasonic flow measurement system.

This document describes ultrasonic fluid mass flow sensor (USFM) systems, and techniques for measuring fluid flow characteristics of fluids, such as mass flow. In general, the USFM systems described in this system can be used in fluid environments that would degrade or destroy existing USFMs. The fluid environmental conditions of fuel delivery systems can impose significant design challenges. For current, state of the art, aircraft and other gas turbine engine applications, an ultrasound transducer deployed for such applications will be expected to survive high fluid pressures (e.g., 0 psi to 4000 psi or higher) and a wide range of fluid temperatures, including high fluid temperatures (e.g., −65 degrees F. or lower to 325 degrees F. or higher).

These temperatures and pressures are far more challenging than those required in typical industrial fluid, steam, or pipeline custody transfer applications. To remain effective in such applications, a wetted transducer must also not be degraded by long-term immersion in caustic fluids such as aircraft fuels and/or additives at high temperatures and/or pressures. The USFM systems described in this document include features that improve the survivability of the USFM under such conditions.

In existing industrial and custody transfer USFMs based on time of flight, cross-correlation, and phase shift measurements have accuracy limitations determined by the flow velocity range, or turndown ratio, within the flow measurement volume. For example, during low flow conditions the difference between upstream and downstream measurements can be too insensitive to maintain a target accuracy. During high flow conditions, measurement accuracy can suffer from flow instabilities, often caused by the acoustic path being off-axis with respect to the flow, flow separation, and/or non-axisymmetric flow conditions. Off-axis transducer configurations can also cause sensitivity and accuracy problems. Round transducers can impose non-uniform ultrasound fields as the waves pass diagonally through the flow, reducing accuracy. In existing USFMs having ultrasound beams smaller than the flow cross-section, the full flow profile is not insonified and therefore must be estimated, typically with a single K-factor correction value, or a complex coefficient matrix for USFMs using multiple sonic paths, such as in natural gas custody transfer applications. In existing USFM designs, flow measurement accuracy can be difficult to maintain over a large turndown ratio when the flow regime is unstable, or changes substantially from laminar to turbulent flow. For example, some existing industrial USFMs have a practical turndown ratio of no more than 50:1 while maintaining accuracy, even when application piping and flow conditioning are executed ideally. By comparison, a gas turbine fuel system can require a substantially higher turndown of generally 100:1, with some applications upward of 350:1 or more. In addition, a gas turbine flow measurement system must be capable of maintaining dynamic accuracy, with update rates of 100 Hz or more.

Mass flow is critical to the combustion process to maintain a safe and operable fuel to air ratio. Excess fuel to air ratio can lead to compressor surge or over temperature events. Conversely, excess air to fuel can lead to compressor blow out. Either of these events can be detrimental to gas turbine performance and are therefore key design drivers for gas turbine engine design. Additionally, some applications such as gas turbine engines are designed to operate on various fuel types under varying pressures and temperatures.

An important variable, especially in aircraft gas turbine applications, is the variation in fuel specific gravity amidst the fuel types and temperatures. In some applications, the expected fuel specific gravity can vary by approximately 25% across expected temperature ranges and useable fuel types. The wide range in fuel density, if unknown, will drive a broad range in mass fuel flow for a given volumetric flow rate. This variability can lead to large variances in mass air to fuel flow ratios, making engine design across the environmental range inefficient, yielding oversized engines, conservative acceleration and/or deceleration schedules, excessive surge margins, and/or excessive blowout margins.

FIG. 1 is a cross-sectional diagram of an example of an ultrasonic flow measurement (USFM) system 100. The USFM system 100 is a sensor system that includes a fluid housing 110, a time-of-flight (TOF) transducer 180a, a TOF transducer 180b, three fluid acoustic impedance sensor (AIS) modules 102a, 102b, 102c, and a controller 190.

The fluid housing 110 defines a fluid flow conduit 112 that includes an axial fluid housing cavity 120a defined by a fluid housing portion having an interior surface 121a, and an axial fluid housing cavity 120b defined by another fluid housing portion having an interior surface 121b. A fluid port 122a defines a fluid path 124a arranged in fluidic communication with the fluid cavity 120a. A fluid port 122b defines a fluid path 124b arranged in fluidic communication with the fluid cavity 120b. The fluid housing 110 also defines a cavity 126 that extends between the fluid cavity 120a and the fluid cavity 120b.

The fluid housing 110 also includes a fluid control conduit 130 that defines a fluid path 132 along a conduit axis 134 that defines another portion of the fluid flow conduit 112. The fluid control conduit 130 is a tubular fluid conduit that fluidically connects the fluid cavity 120a and the fluid cavity 120b, putting the fluid cavity 120a in fluidic communication with the fluid cavity 120b. The fluid control conduit 130 has a predetermined flowable area 136 and shape (e.g., square, tapered, and/or curved edges, parallel or tapered walls, to affect fluid flow behavior). In some implementations, the fluid housing 110 can be used across many applications, and the fluid control conduit 130 can be an interchangeable, specialized subcomponent (e.g., an adapter) that can adapt the USFM system 100 for particular fluid types, applications, and/or operational conditions.

The two TOF transducers 180a-180b face each other across the fluid control conduit 130. The acoustic transducer elements of the TOF transducers 180a and 180b are separated by a predetermined distance 150.

The TOF transducers 180a-180b are configured to be controlled by the controller 190. The controller 190 includes circuitry configured to activate the TOF transducers 180a-180b to cause acoustic incident waves to be emitted, to detect the reception of acoustic waves at the TOF transducers 180a-180b, measure the timings and/or amplitudes between transmission and reception of various combinations of direct and reflected acoustic waves, and/or determine various properties of the USFM system 100 and/or the fluid based in part on those measured timings as will be discussed further in the descriptions of FIGS. 3-11.

The controller 190 includes circuitry configured to activate the AIS modules 102a-102c to cause acoustic incident waves to be emitted, to detect the reception of acoustic waves at the transducers 102a-102c, measure the timings and/or amplitudes between transmission and reception of various combinations of direct and reflected acoustic waves, and/or to determine acoustic impedance of fluid. The AIS modules 102a-102c are configured to measure the acoustic impedance of a fluid that is present or flowing within the fluid flow conduit 112 and provide those measurements as sensor signals to the controller 190. The controller 190 is configured to receive the acoustic impedance measurement signals, and use those measurements to determine properties of fluid flowing through the system 100, such as mass flow rates, based on the measured acoustic impedance and on time-of-flight measurements by the TOF transducers 180a and 180b.

In the illustrated example, the three AIS modules 102a-102c represent three different possible locations where one or more of the AIS modules 102a-102c can be placed in fluidic communication with the fluid in the fluid flow conduit 112. In some embodiments, a single AIS module may be used. For example, the AIS module 102a can be placed proximal an inlet (e.g., the fluid port 122a), and/or the AIS module 102c can be placed proximal an outlet (e.g., the fluid port 122b), and/or the AIS module 102b can be placed midstream (e.g., along the fluid control conduit 130). In some embodiments, one or more of the AIS modules 102a-102c can be in fluidic communication with an auxiliary fluid conduit, such as a conduit that is teed off from one or more of the fluid paths 124a, 124b, and/or 132. In some embodiments, multiple AIS units 102a-102c can be used (e.g., for redundancy, signal averaging).

Mass fuel flow sensing can be achieved by implementing two TOF transducers per channel, in which each transducer sends and receives an acoustic signal though a fluid, and one or more AIS modules configured to determine the acoustic impedance of the fluid. The signals used for mass fuel flow sensing can be based on time transits upstream and downstream (e.g., between the TOF transducer 180a and the TOF transducer 180b, for velocity), and internal transducer reflections (e.g., of one or more of the AIS modules 102a-102c, for impedance sensing).

Figure 2:
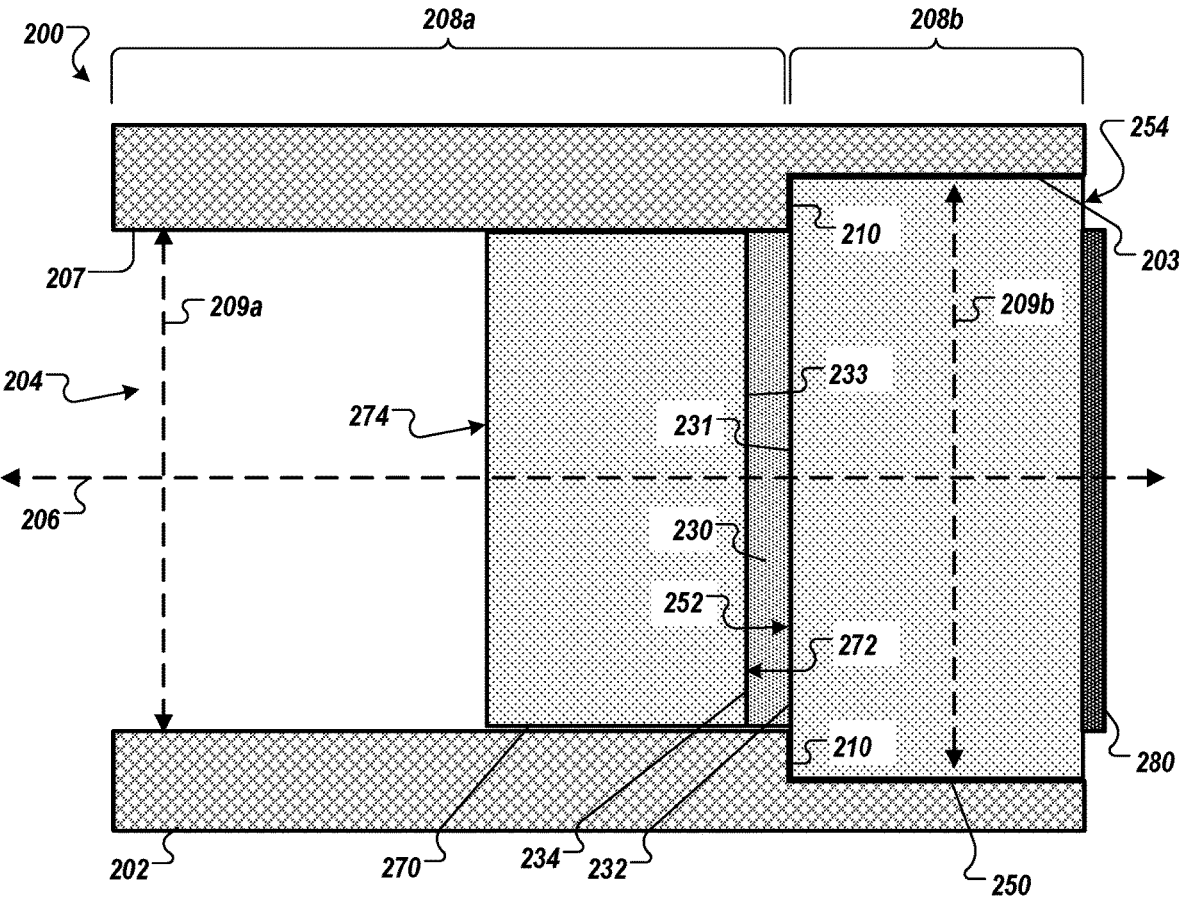
FIG. 2 is a cross-sectional diagram of an example ultrasonic sensor module.

FIG. 2 shows an enlarged cross-sectional diagram of an example ultrasonic sensor module 200. In some embodiments, the ultrasonic sensor module 200 can be one or more of the example AIS modules 102a-102c of the system of FIG. 1. In some embodiments, the example ultrasonic sensor module 200 can be used as one or both of the example TOF transducers 180a and/or 180b.

The ultrasonic sensor module 200 includes a sensor housing 202 having an axial interior sensor housing cavity 204 and a sensor axis 206 defined by an interior surface 207. The sensor housing 202 has an axial sensor housing portion 208a having a cross-sectional area 209a perpendicular to the sensor axis 206. The sensor housing 202 also has an axial sensor housing portion 208b having a cross-sectional area 209b perpendicular to the sensor axis 206. The cross-sectional area 209b is dimensionally larger than the cross-sectional area 209a. A face 210 extends from the interior surface 207 of the axial sensor housing portion 208a to an interior surface 203 of the axial sensor housing portion 208b. In the illustrated example, the face 210 is formed as a substantially squared shoulder or ledge at the transition between the cross-sectional area 209a and the cross-sectional area 209b. In some embodiments, the face 210 can be a tapered or otherwise non-squared transition between the cross-sectional area 209a and the cross-sectional area 209b.

The ultrasonic sensor module 200 also includes an acoustic transceiver element 230. The acoustic transceiver element 230 is configured to emit acoustic vibrations (e.g., ultrasonic sounds waves) at a predetermined wavelength (A) when energized. In some embodiments, a separate acoustic driver and acoustic receiver may be implemented as the acoustic transceiver element 230. In some embodiments, the acoustic transceiver element 230 can also be configured to detect received acoustic vibrations. In some embodiments, the acoustic transceiver element 230 can be a piezo element.

The acoustic transceiver element 230 is arranged between an axial buffer rod 250 and an axial buffer rod 270. A face 231 of the acoustic transceiver element 230 is acoustically mated or otherwise abutted to an axial end 252 of the buffer rod 250 by a bonding layer 232. A face 233 of the acoustic transceiver element 230, opposite the face 231, is acoustically mated or otherwise abutted to an axial end 272 of the buffer rod 270 by a bonding layer 234. In some embodiments, the bonding layers 232 and 234 can be adhesive layers.

In some embodiments, the buffer rods 250 and 270 can be made of any appropriate material or combination of materials that can provide proper acoustic impedance ratios when combined with matching layer material to improve or maximize sensitivity of measurements, are cost effective, can be fabricated within reasonable manufacturing tolerances, and/or provide good mechanical and chemical compatibility in the intended application environment. Examples of buffer rod materials include titanium alloys, austenitic stainless steel, aluminum, borosilicate glasses, fused (e.g., non-crystalline) quartz, and technical ceramics (e.g., AlN, Al₃O₃, SiN, and blends).

In some embodiments, the bonding layers 232 and/or 234 can be omitted, with the acoustic transceiver element 230 in direct contact with the axial ends 252 and/or 272. For example, the acoustic transceiver element 230 can be held in place by mechanically capturing the acoustic transceiver element 230 between the axial buffer rods 250 and 270, or the acoustic transceiver element 230 can be held in place by fixation features formed in the interior surface 207. In some embodiments, the bonding layers 232 and/or 234 can be formed from a highly ductile material, such as gold or lead, which can be conformed to the mating faces of the acoustic transceiver element 230 and the axial ends 252 and 272.

The axial buffer rod 250 extends along the sensor axis 206 from the axial end 252 to an axial end 254 opposite the axial end 252. The axial buffer rod 250 has a predetermined axial length of about a round multiple of one-half of the transmission wavelength of the acoustic transceiver element 230 (n/2 λ). In some embodiments in which long buffer rods are used (e.g., where n is greater than about 10), the predetermined axial lengths may not need to be configured with round multiples of the one-half wavelength. In some embodiments, the axial buffer rod 250 can contact the interior surface 203 directly or indirectly (e.g., through a seal, sleeve, or bonding material) to substantially seal the sensor cavity 204 and the acoustic transceiver element 230 from fluid incursion at the axial end 254. When the ultrasonic sensor module 200 is assembled to the fluid housing 110 of FIG. 1, the axial end 254 is exposed to the fluid conduit 112, placing the ultrasonic sensor module 200 in fluidic communication with a fluid flowing through in the system 100.

The axial buffer rod 270 extends along the sensor axis 206 from the axial end 272 to an axial end 274 opposite the axial end 272. The axial buffer rod 270 has a predetermined axial length of about a round multiple of one-half of the transmission wavelength of the acoustic transceiver element 230 (n/2 λ). In some embodiments, the axial buffer rod 270 can contact the interior surface 207 directly or indirectly (e.g., through a seal, sleeve, potting, or bonding material) to substantially seal the sensor cavity 204 and the acoustic transceiver element 230 from fluid incursion at the axial end 254, and/or to enhance the robustness of the USFM module 200. In some embodiments, the axial buffer rod 270 can be spaced apart from the interior surface 207 by a gap (e.g., an air gap).

The buffer rods 250 and 270 have predetermined acoustic impedances ($Z_{buffer}$). In the illustrated example, the cavity 204 is filled with a gas, such as air, or a partial vacuum. In some embodiments, the acoustic impedance of the content (e.g., medium) of the cavity can be at least 1000× lower than that of the buffer rod over the operating temperature range of the sensor. The acoustic impedance of the cavity is sufficiently different from the acoustic impedance of the buffer rod 270 to reflect an acoustic echo when struck by an acoustic wave (e.g., an ultrasonic ping). In some embodiments, the cavity 204 can be evacuated to form at least a partial vacuum. The axial end 254 forms part of the fluid conduit 130 of FIG. 1, which in use is filled with a fluid (e.g., fuel) having an acoustic impedance that is sufficiently different from the acoustic impedance of the buffer rod 250 to reflect an acoustic echo when struck by an acoustic wave (e.g., an ultrasonic ping).

In some embodiments, portions of the buffer rods 250 and/or 270 may include a cladding. For example, the cladding can be configured to improve the efficiency and/or sensitivity of the ultrasonic sensor module 200 by directing the propagation of incident waves, acoustically and/or electrically isolating the buffer rods 250 and 270 from the sensor housing 202, and/or thermally insulating the buffer rods 250 and 270 from the sensor housing 202.

Still referring to FIG. 2, the ultrasonic sensor module 200 includes a matching layer 280 acoustically mated with, affixed to, or otherwise abutted to the axial end 254 of the buffer rod 250. In some embodiments, the matching layer 280 may be adhered, bonded, attached, or otherwise affixed to the axial end 254. In some embodiments, portions of the matching layer 280 may extend to the sensor housing 202 and be affixed (e.g., welded) to the sensor housing 202. In some embodiments in which the matching layer 280 is affixed to the sensor housing 202, the joint between the matching layer 280 and the sensor housing 202 can substantially seal the sensor cavity 204 from fluid incursion at the axial end 254. The matching layer 280 has an axial thickness that is about a round odd multiple of the transmission wavelength of the acoustic transceiver element 230 (e.g., $(2n-1)\lambda/4$ where $n>0$), for example 1/4 $\lambda$.

In some embodiments, the matching layer 280 can increase reflection sensitivity, improving or maximizing the rate of change of reflection coefficient with respect to change in fluid impedance, $d_R/dZ_{fluid}$, e.g., as fuel changes temperature, $Z_{fluid}$ changes and therefore the reflection ratio changes. In some embodiments, the use of two or more 1/4 wave discrete matching layers, a multilayer 1/4 wave graded composite matching layer, or a multilayer thin film 1/4 wave matching layer, along with the optional inclusion of a non-acoustic (e.g., $<1/10$ wave) wear plate can provide additional reflection sensitivity above that obtainable with a single matching layer In use, a fluid is flowed through the USFM system 100. For example, a fluid such as fuel can be provided at the fluid port 122a where it will flow along the fluid path 124a into the fluid cavity 120a. The fluid flows around the ultrasonic sensor module 200 to the fluid control conduit 130. The fluid flows through the fluid control conduit 130 along the fluid path 132 and then flows around the ultrasonic sensor module 200 to the fluid cavity 120b. The fluid then flows along the fluid path 124b out the fluid port 122b. As will be discussed further in the descriptions of FIGS. 3-9, the ultrasonic sensor modules 200 are protected from direct exposure to the fluid, and are used to transmit acoustic waves through the fluid to determine properties of the fluid, such as acoustic impedance and mass flow.

Figure 3:
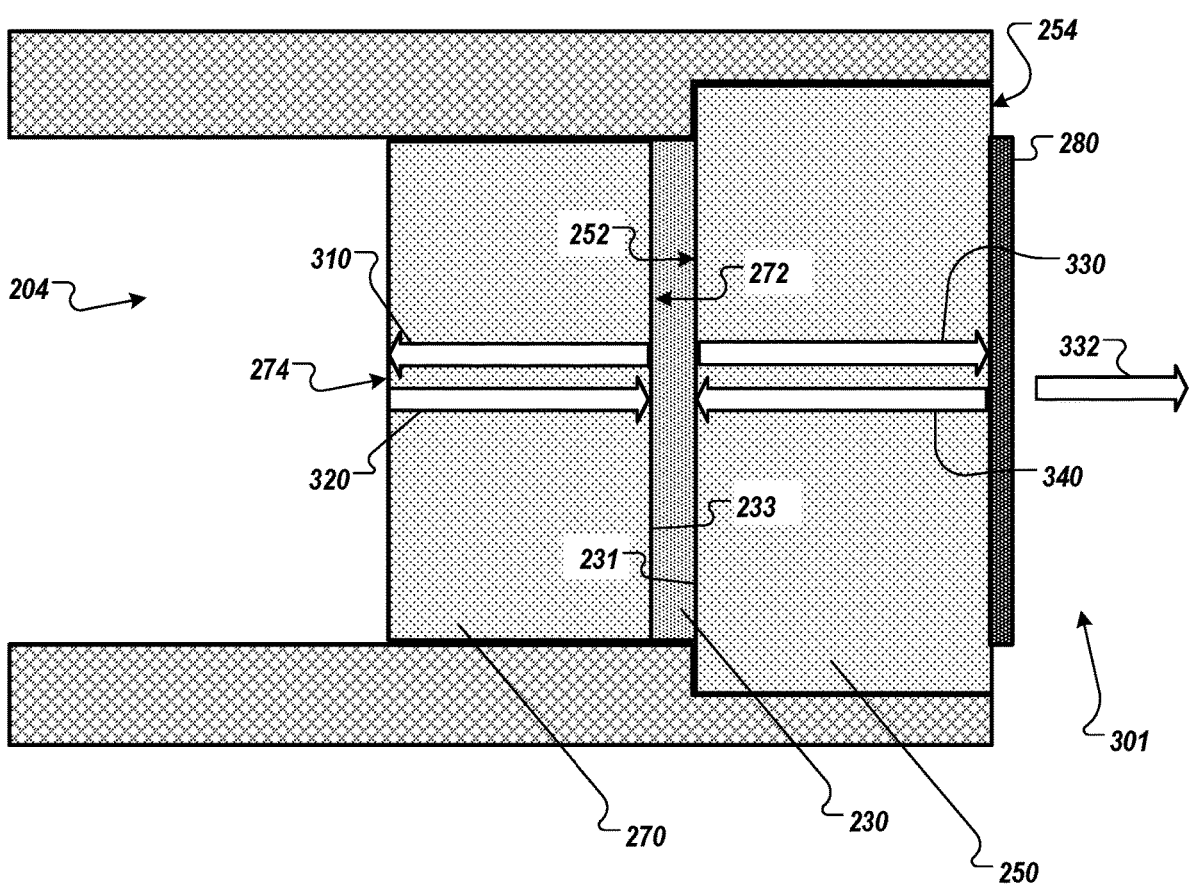
FIG. 3 shows a conceptual example of incident and reflected wave propagation in the module of FIG. 2.

FIG. 3 shows a conceptual example of incident wave propagation in the ultrasonic sensor module 200 of FIG. 2. In use, the acoustic transceiver element 230 is activated to emit an incident wave (e.g., a ping). The incident wave is emitted from both of the faces 231 and 233. The incident wave is transmitted into and along the buffer rods 250 and 270. A portion of the incident wave, represented by arrow 310, travels through the axial buffer rod 270 until it encounters the axial end 274. The junction of the axial end 274 and the cavity 204 causes a portion of the incident wave 310 to be reflected as an echo represented by arrow 320. The echo 320 travels back to be detected by the acoustic transceiver element 230. In some embodiments, the ultrasonic sensor module 200 may include a separate acoustic emitter and receiver for transmission and detection of the incident waves.

Another portion of the incident wave, represented by arrow 330, travels through the axial buffer rod 250 until it encounters the axial end 254. The junction of the axial end 254 and a fluid 301 at the matching layer 280 (e.g., or at the axial end 254 in embodiments in which the matching layer 280 is not used) causes a portion of the incident wave 330 to be reflected as an echo represented by arrow 340. Another portion of the incident wave 332 travels into the fluid. The echo 340 travels back to be detected by the acoustic transceiver element 230.

In some implementations, the time between the transmission of the incident wave and detection of the echo 320 can be measured (e.g., by the example controller 190 of FIG. 1) to determine a first time of flight. In some implementations, the time between the transmission of the incident wave and detection of the echo 340 can be measured to determine a second time of flight. The amplitudes of the echo 320 and the echo 340 are measured. As will be discussed further in the descriptions of FIGS. 6A-7B, the measured times-of-flight, the measured echo amplitudes, and predetermined information about the acoustic impedance of the buffer rods 250 and 270 and the predetermined distances between the acoustic transceiver element 230, the axial end 254, and the axial end 274, can be used to determine properties of the fluid 301 at the axial end 254, such as acoustic impedance ($Z_{fluid}$) and/or speed of sound in the fluid ($C_{fluid}$).

In some implementations, the ultrasonic sensor module 200 can be used in applications other than the USFM system 100. For example, the ultrasonic sensor module 200 can be put into contact with a fluid (e.g., attached to or submerged in a tank, pipe, or other fluid vessel or volume) and can be sonified as part of a process to determine an acoustic impedance of the fluid, a speed of sound in the fluid, and/or a fluid density of the fluid.

In some implementations, characteristics (e.g., physical and/or environmental characteristics, such as sound speed, length, temperature) of the buffer rods 250 and/or 270 themselves can be determined based on the measured times-of-flight and/or the measured echo amplitudes (e.g., to calibrate for unknown buffer rod acoustic impedance and/or compensate for the effects of temperature changes on the ultrasonic sensor module 200). Similarly, in some implementations, the distances between the acoustic transceiver element 230 and one or both of the axial end 274 and/or the axial end 254 can be determined based on the measured times of flight, the measured echo amplitudes, known distances, known buffer rod acoustic impedance, and/or known buffer rod temperature. In some implementations, measured parameters can be used to determine physical and/or environmental parameters, such as sound speed, length, and/or temperature.

Figure 4:
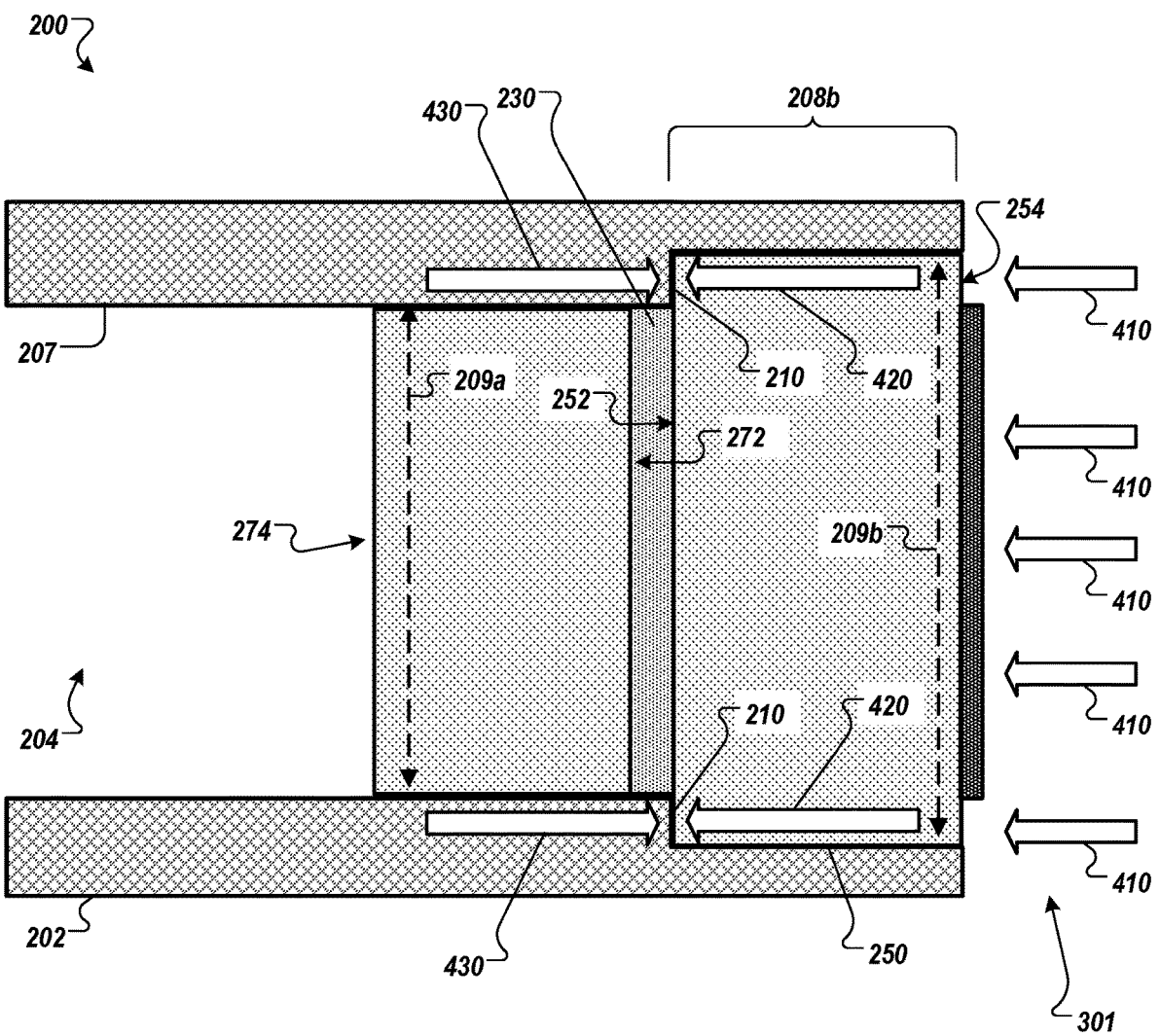
FIG. 4 shows a conceptual example of fluid pressure mitigation in the module of FIG. 2.

FIG. 4 shows a conceptual example of fluid pressure mitigation in the ultrasonic sensor module 200 of FIG. 2. In use, the ultrasonic sensor module 200 is at least partly exposed to the fluid 301 at the axial end 254. In some embodiments, the temperature or chemical properties of the fluid 301 can be damaging to the acoustic transceiver element 230; therefore, the ultrasonic sensor module 200 is configured to prevent the fluid 301 from coming into direct contact with the acoustic transceiver element 230. For example, direct or indirect (e.g., though a shim, sleeve, cladding, seal, or sealant) contact between axial buffer rod 250 and the axial sensor housing portion 208b and/or between the buffer rod 250 and the face 210 can substantially block fluid flow from the axial end 254 to the acoustic transceiver element 230. In some implementations, fluid seepage that gets by the buffer rod 250 can be directed to the sensor cavity 204 without contacting a major face of the acoustic transceiver element 230.

In use, the ultrasonic sensor module 200 is at least partly exposed to fluid pressure, represented by arrows 410, at the axial end 254. The fluid pressure 410 is a static fluid pressure relative to the dynamic pressures caused by the acoustic signals used by the acoustic transceiver element 230. In some embodiments, direct or indirect (e.g., through the buffer rod 250) application of the fluid pressure 410 could create a compressive force against the acoustic transceiver element 230 that could offset or otherwise negatively affect signals provided by the acoustic transceiver element 230 in response to sensed acoustic signals. In some implementations, such effects can be compensated by mathematically or electrically offsetting the sensor signals in order to recover an approximation of the true signal.

The ultrasonic sensor module 200 is configured to prevent the fluid pressure 410 from affecting the acoustic transceiver element 230. For example, the acoustic transceiver element 230 is acoustically mated to the axial end 252. As such, the acoustic transceiver element 230 is able to "float" on the buffer rod 250 relative to the sensor housing 202 and not become compressed by the fluid pressure 410.

The acoustic transceiver element 230 is also protected from the fluid pressure 410 by the mechanical configuration of the buffer rod 250 and the sensor housing 202. Fluid pressure 410 is applied to the axial end 254, which urges movement of the buffer rod 250 into the sensor cavity 204. This pressure that urges such movement is represented by arrows 420. Movement of the buffer rod 250 is prevented by contact between the axial buffer rod 250 and the face 210 of the sensor housing 202, as represented by arrows 430. As such, the force 420 is prevented from reaching the acoustic transceiver element 230.

The smaller size of the cross-sectional area 209a is sized to accommodate acoustic transceiver element 230 and decouple thermal expansion of the sensor housing 202 from the acoustic path. The larger size of the cross-sectional area 209b is sized to accommodate the pressure-induced forces acting on the buffer rod 250. The transmission of forces into the sensor housing 202 substantially eliminates pressure-induced forces from acting on the acoustic transceiver element 230, substantially eliminating the need for pressure compensation, transducer components that are sized to react pressure-induced forces, and/or wetted transducer design constraints.

By decoupling the acoustic transceiver element 230 from the fluid pressure environment, several advantages are observed. For example, fluid/fuel compatibility of the acoustic transceiver element 230 is not required. In another example, the acoustic transceiver element 230 frequency is not restricted by thickness requirements driven by pressure-induced forces. In another example in which the acoustic transceiver element 230 is a piezo transducer, the piezo thickness required to support fluid pressure puts the operating frequency of the acoustic transceiver element 230 far below operating requirements of time of flight measurement. In yet another example, the operational frequency of the acoustic transceiver element 230 can be sized to improve acoustic optimization and/or low flow measurement accuracy.

Figure 5A:
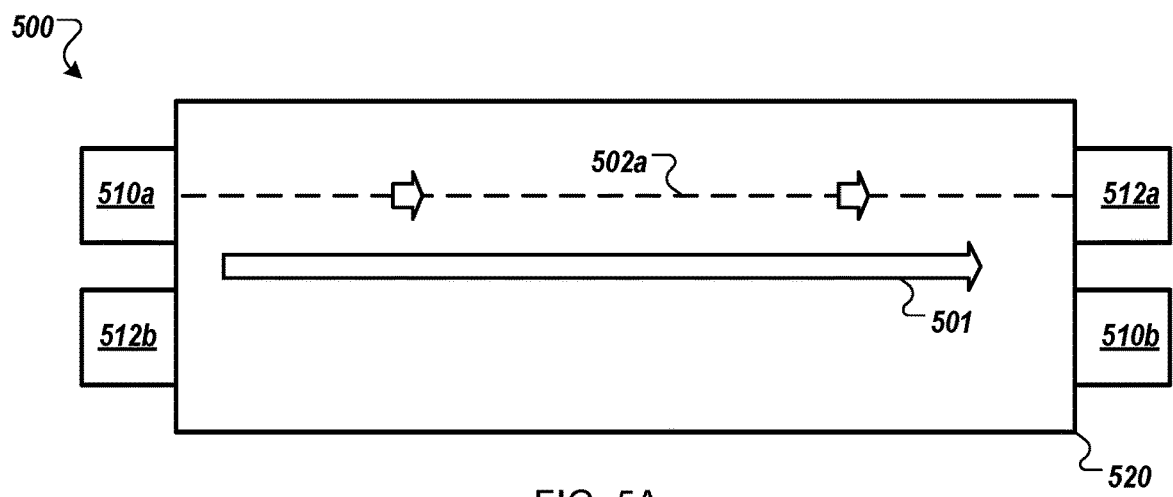
FIGS. 5A-5C show conceptual examples of incident wave traversal in an ultrasonic flow measurement system.
Figure 5B:
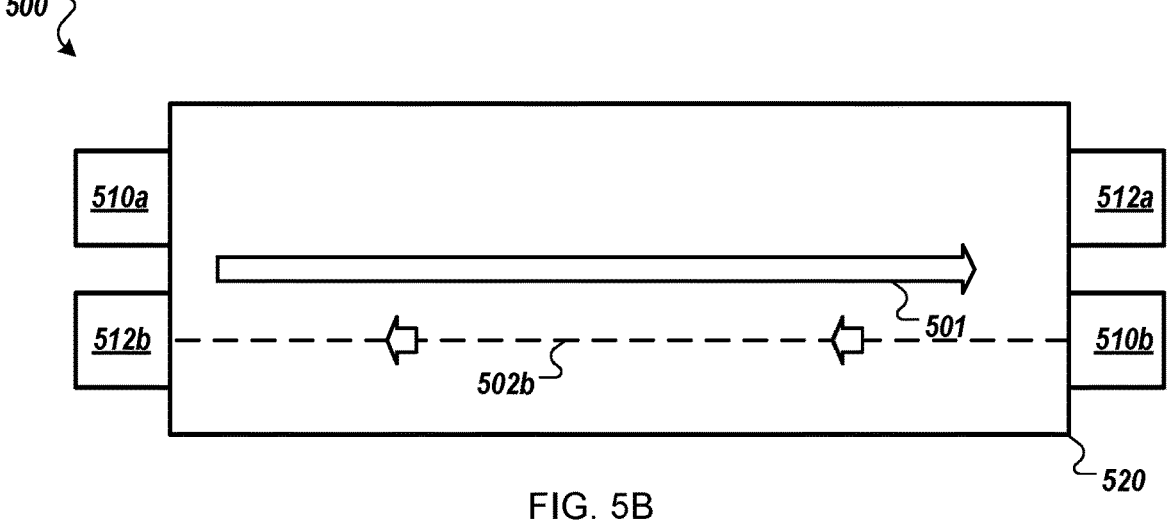
Figure 5C:
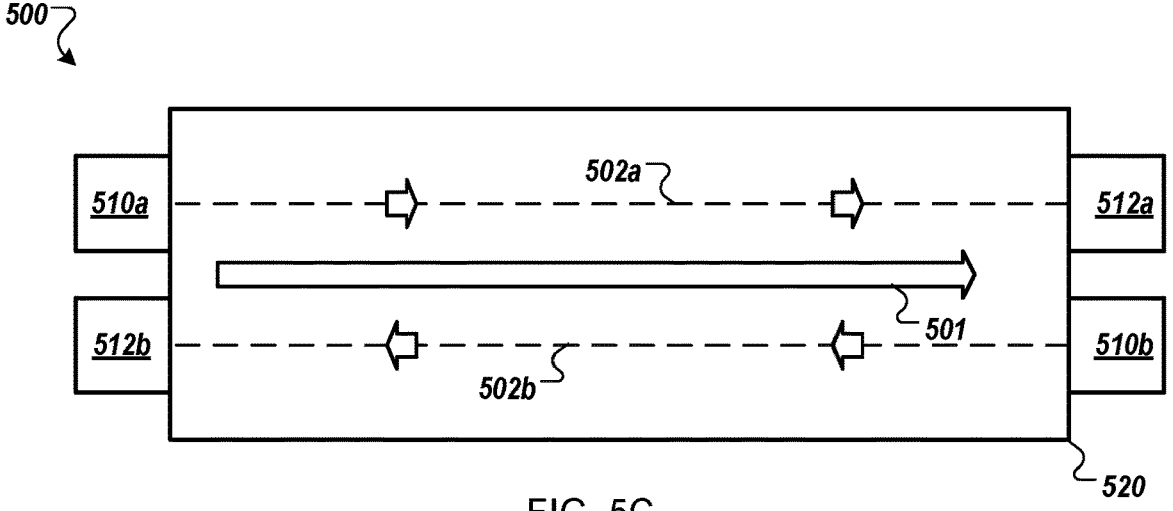

FIGS. 5A-5C show conceptual examples of incident wave traversal in an ultrasonic flow measurement system 500. In some implementations, the USFM system 500 can be an example of the USFM system 100 of FIG. 1. The USFM system 500 includes two acoustic emitters 510a and 510b, two acoustic receivers 512a and -512b, and a fluid control conduit 520. A fluid flows along the fluid control conduit 520 in a direction represented by arrow 501.

The derivation that follows assumes that the acoustic receivers 512a and 512b are aligned with their respective acoustic emitters 510a and 510b, perpendicular to the major axis of the fluid control conduit 520. Therefore, the below derivation omits angles of incidence. If the acoustic emitters 510a, 510b and acoustic receivers 512a, 512b were placed off axis, the following derivation could be re-derived using an angle of incidence. However, for simplicity, the trigonometry used to compensate for such angles is not used here.

Referring to FIG. 5A, first, the speed of sound traveling through a non-moving fluid is considered:

$$\text{Distance} = \text{Velocity} \times \text{time}$$

Or:

$$\text{Length } (L) = \text{Speed of sound in fluid } (C_{fluid}) \times \text{time } (t)$$

$$\therefore L_1 = C_{fluid} \times t_1$$

$$t_1 = \frac{L_1}{C_{fluid}}$$

Where $C_{fliuid}$ is the speed of sound in fluid, $L_1$ is the distance between the acoustic emitter 510a and the acoustic receiver 512a, and $t_1$ is the signal transit time between the acoustic emitter 510a and the acoustic receiver 512a.

Assuming that the direction 501 in which the control volume (fluid) is moving is the same as a direction of sound travel, represented by line 502a from the acoustic emitter 510a to the acoustic receiver 512a, the speed of the sound wave traveling through the fluid will change relative to the speed of the fluid.

$$\therefore L_2 = V_2 \times t_2$$

$$V_2 = V_{fluid} + C_{fluid}$$

$$\therefore L_2 = (V_{fluid} + C_{fluid})t_2$$

$$t_2 = \frac{L_2}{(C_{fluid} + V_{fluid})}$$

Where $V_{fluid}$ is the average velocity of moving fluid, $L_2$ is the distance between the acoustic emitter 510a and the acoustic receiver 512a, and $t_2$ is the signal transit time between the acoustic emitter 510a and the acoustic receiver 512a.

Referring now to FIG. 5B, it is assumed that the control volume (fluid) is opposing the direction of the sound travel from the acoustic emitter 510b to the acoustic receiver 512b, represented by line 502b. The speed of the sound wave traveling through the fluid will change relative to the speed of the fluid.

$$\therefore L_3 = V_3 \times t_3$$

$$V_3 = -V_{fluid} + C_{fluid}$$

$$\therefore L_3 = (-V_{fluid} + C_{fluid})t_3$$

$$t_3 = \frac{L_3}{(C_{fluid} - V_{fluid})}$$

Where $L_3$ is the distance between the acoustic emitter 510b and the acoustic receiver 512b, and $t_3$ is the signal transit time between the acoustic emitter 510b and the acoustic receiver 512b.

Referring to FIG. 5C, for a particular set of ultrasonic sensors, the devices can both emit and receive signals. This means that for a pair of signals, the following characteristics are shared:

$L_{up}$=$L_{down}$=L=distance between emitters;

D=diameter Area of the fluid control conduit 520;

A=cross section area;

$C_{fluid}$=speed of sound in fluid;

$V_{fluid}$=velocity of fluid;

$P_{fluid}$=density of fluid;

$Z_{fluid}$=Acoustic impedance of fluid.

With the above properties shared, the difference in time between the upstream and downstream signal will allow calculation of various fluid characteristics.

Upstream and downstream transit times become:

$$t_{up} = \frac{L_{up}}{(C_{fluid} - V_{fluid})}$$

$$t_{down} = \frac{L_{down}}{(C_{fluid} + V_{fluid})}$$

Solving for $t_{up}$, $t_{down}$, and $C_{fluid}$:

$$C_{fluid} = \frac{(L_{down} - t_{down} V_{fluid})}{t_{down}}$$

$$C_{fluid} = \frac{(L_{up} + t_{up} V_{fluid})}{t_{up}}$$

Since speed of sound is common between the transducers, the speeds of sound are equal to one another and allows fluid velocity to be found:

$$C_{fluid} = C_{fluid}$$

$$\frac{(L_{down} - t_{down} V_{fluid})}{t_{down}} = \frac{(L_{up} + t_{up} V_{fluid})}{t_{up}}$$

$$L_{down} t_{up} - t_{down} t_{up} V_{fluid} = L_{up} t_{down} + t_{up} t_{down} V_{fluid}$$

$$L_{down} t_{up} - L_{up} t_{down} = t_{up} t_{down} V_{fluid} + t_{down} t_{up} V_{fluid}$$

$$L_{up} = L_{down}$$

$$L(t_{up} - t_{dn}) = 2 V_{fluid} t_{up} t_{down}$$

$$V_{fluid} = \frac{L(t_{up} - t_{down})}{2 t_{up} t_{down}}$$

Knowing the velocity of the fluid allows the volume fluid flow ($Q_{fluid}$) to be determined, where $C_d$ is a predetermined discharge coefficient of the fluid in the fluid control conduit 520:

$$Q_{fluid}=C_d \times A \times V_{fluid}$$

Fluid sound speed properties can also be determined. Since the fluid velocity is shared between the pair of transducers, the fluid velocity can be solved. Recalling that:

$$t_{up} = \frac{L_{up}}{(C_{fluid} - V_{fluid})}$$

-continued

And:

$$t_{down} = \frac{L_{down}}{(C_{fluid} + V_{fluid})}$$

Solving $t_{up}$ and $t_{down}$ for $V_{fluid}$:

$$V_{fluid}=(L_{down} - t_{down} C_{fluid})/t_{down}$$

$$V_{fluid}=(-L_{up} + t_{up} C_{fluid})/t_{up}$$

Since velocity of the fluid is common between the transducers, the previous two equations equal one another and allow fluid sound speed to be solved:

$$V_{fluid} = V_{fluid}$$

$$\frac{(L_{down} - t_{down} C_{fluid})}{t_{down}} = \frac{(-L_{up} + t_{up} C_{fluid})}{t_{up}}$$

$$L_{down} t_{up} - t_{down} t_{up} C_{fluid} = -L_{up} t_{down} + t_{up} t_{down} C_{fluid}$$

$$L_{down} t_{up} + L_{up} t_{down} = t_{up} t_{down} C_{fluid} + t_{down} t_{up} C_{fluid}$$

$$L_{up} = L_{down}$$

$$L(t_{up} + t_{down}) = -2 C_{fluid} t_{up} t_{down}$$

$$C_{fluid} = \frac{L(t_{up} + t_{down})}{2 t_{up} t_{down}}$$

Figure 6A:
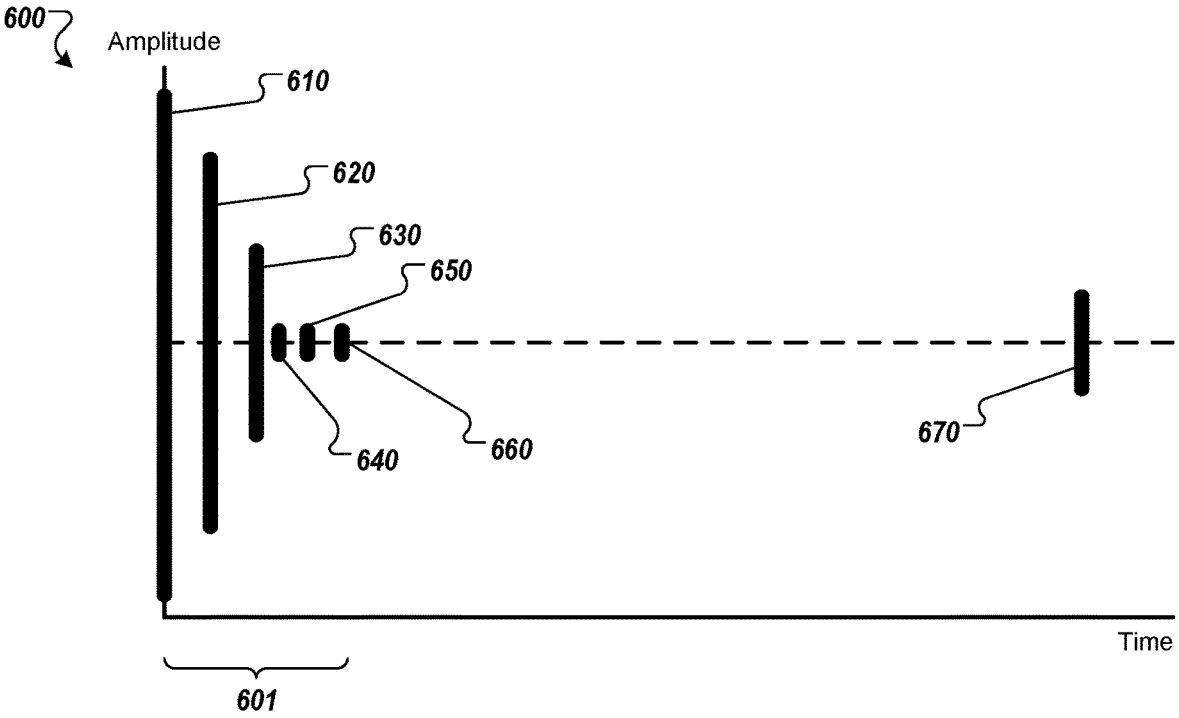
FIGS. 6A and 6B are graphs that show example incident waves and echoes in the ultrasonic flow measurement system of FIG. 1.
Figure 6B:
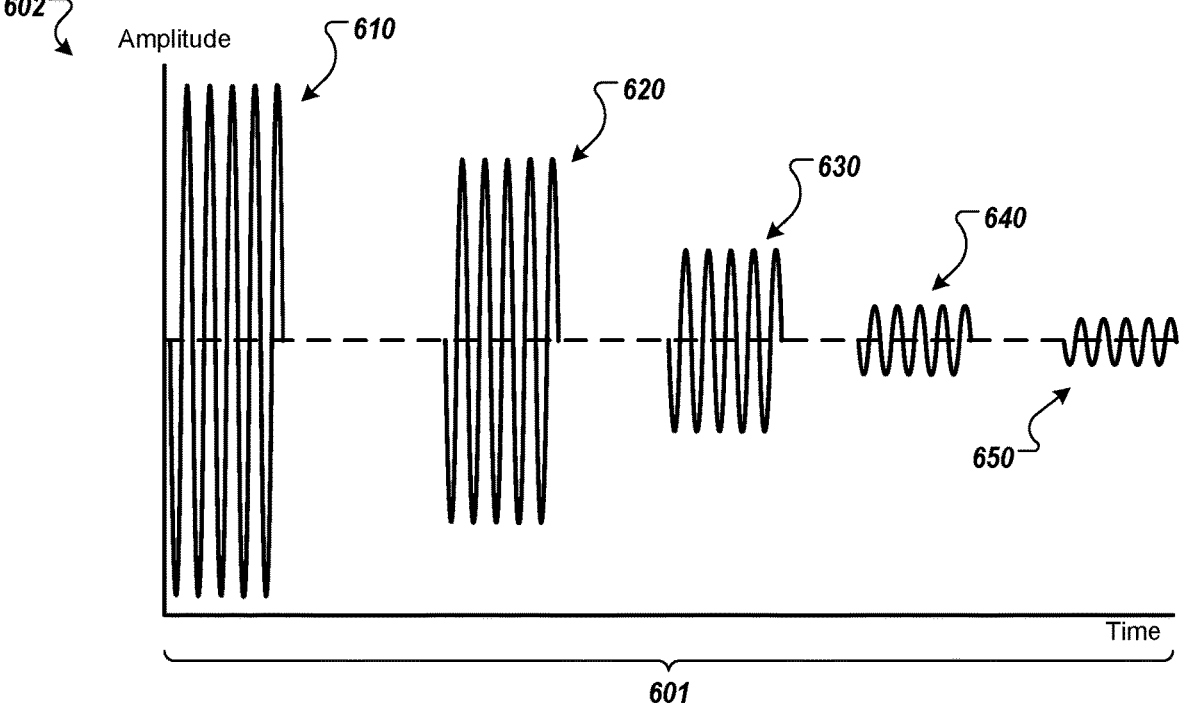

FIGS. 6A and 6B are graphs that show example incident waves and echoes in the example ultrasonic flow measurement system 100 of FIG. 1. FIG. 6A shows a graph 600 of acoustic amplitude over time, including a sub-duration 601. FIG. 6B shows a graph 602 in which the sub-duration 601 has been expanded for visibility.

The graph 600 shows a representation of the emission of an initial incident wave 610 (e.g., when the acoustic transceiver element 230 is activated to send an acoustic "ping"). An echo 620 is received a few microseconds later. In some implementations, the echo 620 can be the echo 320 of FIG. 3, which is a reflection of a portion of the incident wave 310 off the face 274 at the cavity 204.

An echo 630 is received a few microseconds later. In some implementations, the echo 630 can be the echo 340, which is a reflection of a portion of the incident wave 330 off the axial end 254, which is also an interface to the fluid. Echoes 640, 650, and 660 represent reverberations in the buffer rods 250 and 270. In operation, the echoes 640-660 can be filtered out or otherwise ignored.

An incident wave 670 represents a portion of the incident wave that is received by an acoustic sensor (e.g., the acoustic transceiver element 230 located downstream or otherwise opposite the acoustic transceiver element 230 that transmitted the incident wave). The amount of time taken by the incident wave 670 to arrive is affected by several variables, such as the fluid density, flow rate, and flow direction of the fluid in the fluid control conduit 130, and the distance 150. The amount of time taken for the incident wave 670 can be used as $t_{up}$ or $t_{down}$ (e.g., depending on whether the wave travelled upstream or downstream in the fluid control conduit 130).

In some embodiments, the incident wave 670 may represent a reflection from a housing cavity wall opposite the acoustic transceiver element. For example, such an incident wave could be used for determination of fluid properties such as sound speed.

For aircraft turbine fuel systems, mass fuel flow rate can be determined for an understanding of combustion energy content. This is solved through the use of the buffer rods 250 and 270. The designs and arrangement of the buffer rods 250 and 270 enables additional acoustic benefits which can be intentionally designed into the USFM system 100. For example, the configuration of the buffer rods 250 and 270 enables the controller 190 to determine reflection coefficients for fuel acoustic impedance measurement. This is achieved by introducing a transducer transmit amplitude response (e.g., echoes 320 or 620), achieved with the cavity 204 which acts as a substantially ideal reflector, and this amplitude can be compared to the return echoes of the buffer rod fluid interface (e.g., echoes 340 or 630). In some embodiments, the sensitivity of the axial end 254 is further enhanced by the matching layer 280, however, this will be ignored in order to simplify the equations below.

Fluid acoustic impedance can be determined by setting echo reflection effective areas equal to one another, for example by configuring the cross-sectional areas 209$a$ and 209$b$ appropriately. In some implementations, the areas can be non-equal, and a mathematical compensation can be integrated into the process. However, for the sake of clarity, the areas are assumed to be equal in the equations below. This allows for direct measurement of the reflection coefficient. The wave propagation within the buffer rod 250 is articulated such that in air, the echo returned from the face 274 is equivalent to the echo from the axial end 254.

The reflection coefficient is found through the use of short time Fourier transforms (STFT). The fast Fourier transforms (FFT) of the two echoes are found to determine the peak of the return echoes:

$$\text{STFT} \rightarrow \text{Amplitude} = f(\text{Frequency})$$

Therefore:

$$|A| = |\text{FFT}(\text{Echo}_1)||_{f=f_0}$$

$$|B| = |\text{FFT}(\text{Echo}_2)||_{f=f_0}$$

Where:

Echo$_1$ is one of the echoes 320 or 620 of FIGS. 3 and 6 respectively, Echo$_2$ is one of the echoes 340 or 630 of FIGS. 3 and 6 respectively, and f and f$_0$ are the transducer driving frequency. The reflection coefficient is then found from:

$$R = \frac{|B|}{|A|}$$

And, assuming the buffer rod 250 is in direct interface with the fluid or fuel (e.g., no matching layer 280 in this case):

$$R = \frac{|Z_2 - Z_1|}{|Z_2 + Z_1|}$$

Where R is the reflection coefficient.

$Z_2 = Z_{fluid}$
$Z_1 = Z_{buffer}$

In some examples, the buffer rod may have properties change with temperature, which can result in a $Z_{buffer}$ term that is a function of temperature. These changes can be compensated through temperature characterization of the buffer rod and use of a temperature-sensing device located in the system, or temperature references can be determined from buffer reflection timing.

$$Z_{fluid} = \frac{Z_{buffer}(1 - R)}{1 + R}$$

The impedance of the buffer rod 250 can be determined through characterization at the sensor level. With the buffer rod impedance known and the reflection coefficient being measured, the fluid impedance can now be solved for:

$$Z_{fluid} = \rho_{fluid} \times C_{fluid}$$

From the equations above, a speed of sound in fluid can be determined. Since fluid impedance and fluid sound speed are known, fluid density can now be solved:

$$\rho_{fluid} = \frac{Z_{fluid}}{C_{fluid}}$$

Explicitly:

$$\rho_{fluid} = \frac{\left(\frac{Z_{buffer}(1-R))}{1+R}\right)}{\left(\frac{L(t_{up} + t_{down})}{2t_{up}t_{down}}\right)}$$

With volumetric fluid flow and density now known, the mass fluid flow rate can be found:

$$\dot{m}_{fluid} = Q_{fluid} \times \rho_{fluid} = C_d \times A \times V_{fluid} \frac{Z_{fluid}}{C_{fluid}}$$

In another implementation, mass fluid flow can be determined using another technique. The derivation below is based on a simplifying assumption that the transducer faces (e.g., piezo electrical ceramic and transducers) are all arranged perpendicular to the axis of the fluid duct. Therefore, the below derivation omits angles of incidence. In examples in which the piezo transducers were placed off axis, the following derivation could be re-derived to include an angle of incidence. However, for simplicity such angles have been ignored here.

Mass fuel flow sensing can be achieved by implementing two TOF transducers per channel, in which each transducer sends and receives an acoustic signal though a fluid, and one or more AIS modules configured to determine the acoustic impedance of the fluid. The signals used for mass fuel flow sensing can be based on time transits upstream and downstream (e.g., between the TOF transducer 180$a$ and the TOF transducer 180$b$, for velocity), and internal transducer reflections (e.g., of one or more of the AIS modules 102$a$-102$c$, for impedance sensing).

$$Q_{fluid} = V_{fluid} \times C_d \times A$$

$$\dot{m}_{fluid} = Q_{fluid} \times \rho_{fluid} \doteq V_{fluid} \times C_{d\times} \times A \times \rho_{fluid}$$

$$z = \rho_{fluid} \times C_{fluid}$$

-continued $$\therefore \rho_{fluid} = \frac{C_{fluid}}{C_d}$$

$$\dot{m}_{fluid} = V_{fluid} \times C_{d\times} \dot{\times} A \times \rho_{fluid} = \left(\frac{V_{fluid}}{C_{fluid}}\right) \times C_d \times A \times Z_{fluid}$$

$$\dot{m}_{fluid} = \left(\frac{t_{up} - t_{down}}{t_{up} + t_{down}}\right) \times C_d \times A \times Z_{fluid}$$

Where $C_d$ and K are commonly interchangeable in literature as a flow correction factor:

$$\dot{m}_{fluid} = V_{fluid} \times \dot{A} \times \rho_{fluid} = \left(\frac{V_{fluid}}{C_{fluid}}\right) \times K \times A \times Z_{fluid}$$

$$\dot{m}_{fluid} = \left(\frac{t_{up} - t_{down}}{t_{up} + t_{down}}\right) \times K \times A \times Z_{fluid}$$

Recalling for TOF transducers upstream and downstream transit times become:

$$t_{up} = \frac{L_{up}}{(C_{fluid} - V_{fluid})}$$

$$t_{down} = \frac{L_{down}}{(C_{fluid} + V_{fluid})}$$

Solving $t_{up}$, $t_{down}$, for L:

$$L_{up} = t_{up} \times C_{fluid} - t_{dn} \times V_{fluid}$$

$$L_{dn} = t_{dn} \times C_{fluid} + t_{dn} \times V_{fluid}$$

Since length is common between the transducers, $L_{up}$ and $L_{dn}$ are equal to one another and allows fuel velocity to sound speed ratio to be found.

$$t_{up} \times C_{fluid} - t_{up} \times V_{fluid} = t_{dn} \times C_{fluid} + t_{dn} \times V_{fluid}$$

$$t_{up} \times C_{fluid} - t_{dn} \times C_{fluid} = t_{dn} \times V_{fluid} + t_{dn} \times V_{fluid}$$

$$\frac{V}{C} = \frac{t_{up} - t_{dn}}{t_{up} + t_{dn}}$$

$$\frac{V_{fluid}}{C_{fluid}} = \frac{t_{up} - t_{dn}}{t_{up} + t_{dn}}$$

Substituting the preceding equation into the earlier equation for mass flow:

$$\dot{m}_{fluid} = \left(\frac{V_{fluid}}{C_{fluid}}\right) \times C_d \times A \times Z_{fluid} = \left(\frac{t_{up} - t_{dn}}{t_{up} + t_{dn}}\right) \times C_d \times A \times Z_{fluid}$$

With the acoustic impedance (Z), the conduit area (A), and the measured time transits known, the mass fluid flow can be solved.

As shown above:

$$Z_{fluid} = \frac{Z_{buffer}(1 - R)}{1 + R}$$

Substituting the previous mass flow equation in the preceding equation:

$$\dot{m}_{fluid} = \left(\frac{V_{fluid}}{C_{fluid}}\right) \times C_d \times A \times Z_{fluid} =$$

$$\left(\frac{t_{up} - t_{dn}}{t_{up} + t_{dn}}\right) \times C_d \times A \times \left(\frac{Z_{buffer}(1 - R)}{1 + R}\right) = \left(\frac{t_{up} - t_{dn}}{t_{up} + t_{dn}}\right) \times C_d \times A \times Z_{fluid}$$

Figure 7A:
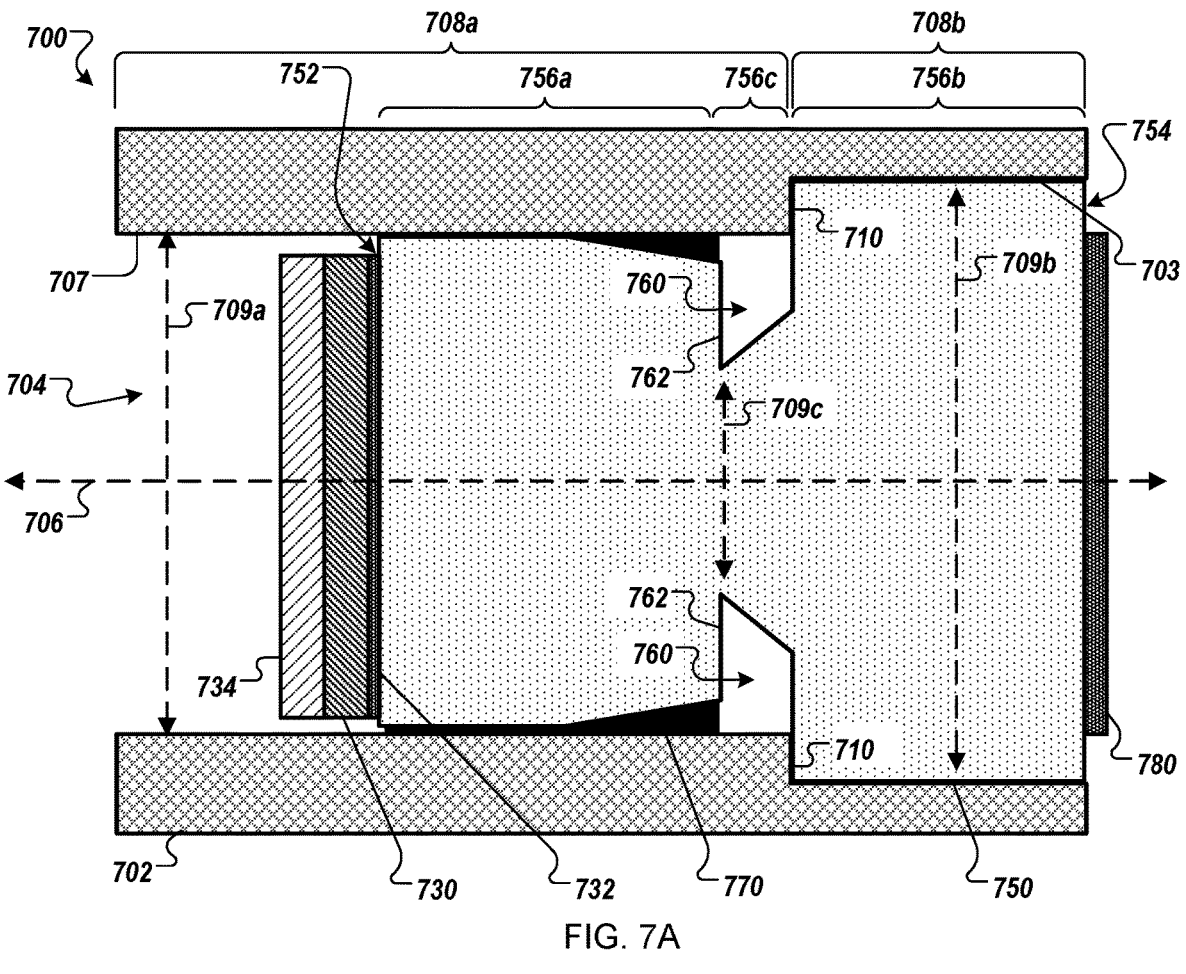
FIG. 7A is a cross-sectional diagram of another example ultrasonic sensor module.

Referring now to FIG. 7A, an enlarged cross-sectional diagram of another example ultrasonic sensor module 700 is shown. In some embodiments, the ultrasonic sensor module 700 can be one or more of the example AIS modules 102a-102c of the system of FIG. 1. In some embodiments, the example ultrasonic sensor module 700 can be used as one or both of the example TOF transducers 180a and/or 180b.

The ultrasonic sensor module 700 includes a sensor housing 702 having an axial interior sensor housing cavity 704 and a sensor axis 706 defined by an interior surface 707. The sensor housing 702 has an axial sensor housing portion 708a having a cross-sectional area 709a perpendicular to the sensor axis 706. The sensor housing 702 also has an axial sensor housing portion 708b having a cross-sectional area 709b perpendicular to the sensor axis 706. The cross-sectional area 709b is dimensionally larger than the cross-sectional area 709a. A face 710 extends from the interior surface 707 of the axial sensor housing portion 708a to an interior surface 703 of the axial sensor housing portion 708b. In the illustrated example, the face 710 is formed as a substantially squared shoulder or ledge at the transition between the cross-sectional area 709a and the cross-sectional area 709b. In some embodiments, the face 710 can be a tapered or otherwise non-squared transition between the cross-sectional area 709a and the cross-sectional area 709b.

The ultrasonic sensor module 700 also includes an acoustic transceiver element 730. The acoustic transceiver element 730 is configured to emit acoustic vibrations (e.g., ultrasonic sounds waves) at a predetermined wavelength ($\lambda$) when energized. In some embodiments, a separate acoustic driver and acoustic receiver may be implemented as the acoustic transceiver element 730. In some embodiments, the acoustic transceiver element 730 can also be configured to detect received acoustic vibrations. In some embodiments, the acoustic transceiver element 730 can be a piezo element.

The acoustic transceiver element 730 is acoustically mated with or otherwise abutted to an axial end 752 of a buffer rod 750 by a bonding layer 732. In some embodiments, the bonding layer 732 can be an adhesive layer. In some embodiments, the buffer rod can be made of any appropriate material or combination of materials that can provide proper acoustic impedance ratios when combined with matching layer material to improve or maximize sensitivity of measurements, are cost effective, can be fabricated within reasonable manufacturing tolerances, and/or provide good mechanical and chemical compatibility in the intended application environment. Examples of buffer rod materials include titanium alloys, austenitic stainless steel, aluminum, borosilicate glasses, fused (e.g., non-crystalline) quartz, and technical ceramics (e.g., AlN, Al₃O₃, SiN, and blends).

In some embodiments, the bonding layer 732 can be omitted, with the acoustic transceiver element 730 in direct contact with the axial end 752. For example, the acoustic transceiver element 730 can be held in place by a mechanical clamp or other appropriate fixation assembly, or the acoustic transceiver element 730 can be held in place by fixation features formed in the interior surface 707. In some embodiments, the bonding layer 732 can be formed from a highly ductile material, such as gold or lead, which can be conformed to the mating faces of the acoustic transceiver element 730 and the axial end 752.

The acoustic transceiver element 730 is backed by a backing 734. The backing 734 has a predetermined form and is made of a material that improves the sensitivity and/or efficiency of the acoustic transceiver element 730.

The buffer rod 750 extends along the sensor axis 706 from the axial end 752 to an axial end 754 opposite the axial end 752. The buffer rod 750 has a predetermined axial length of about a round multiple of one-half of the transmission wavelength of the acoustic transceiver element 730 (n/2 λ). The buffer rod 750 includes an axial buffer portion 756a arranged within the axial sensor housing portion 708a and includes the axial end 752. The buffer rod 750 includes an axial buffer portion 756b arranged within the axial sensor housing portion 708b and includes the axial end 754. In some embodiments, the axial buffer portion 756b can contact the interior surface directly or indirectly (e.g., through a seal, sleeve, or bonding material) to substantially seal the axial interior sensor housing cavity 704 from fluid incursion at the axial end 754.

Figure 7B:
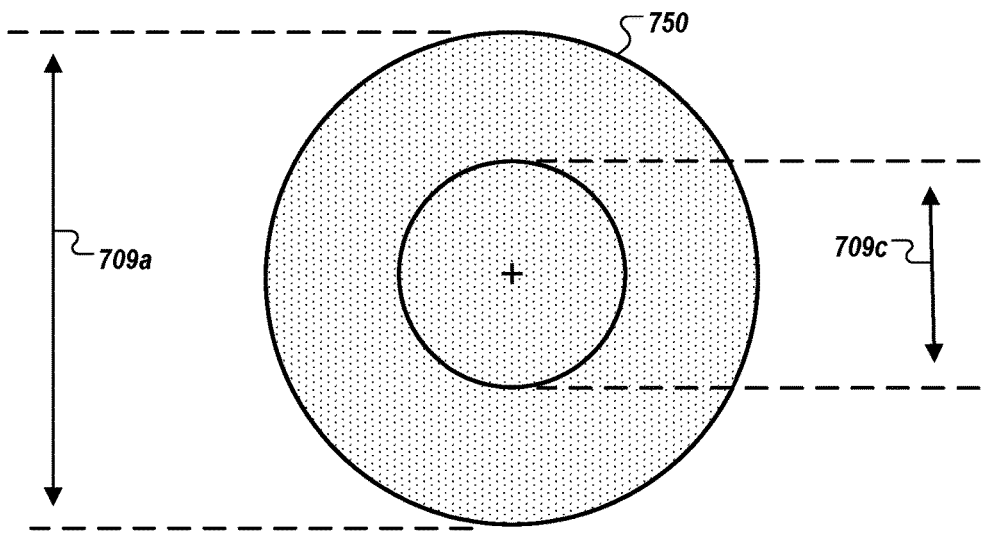
FIG. 7B shows a conceptual example of reflective surface areas in the example ultrasonic sensor module of FIG. 7A.

The buffer rod 750 also includes an axial buffer portion 756c that extends axially between the axial buffer portion 756a and the axial buffer portion 756b. The axial buffer portion 756c has a cross-sectional area 709c that is smaller than the cross-sectional area 709a perpendicular to the sensor axis 706. A cavity 760 is defined between the interior surface 707 and the axial buffer portion 756c. The cavity 760 is partly defined by a face 762 defined between the axial buffer portion 756a and the axial buffer portion 756c. The face 762 is a predetermined distance from the axial end 752. Referring to FIG. 7B, the cross-sectional area 709a is about twice as large as the cross-sectional area 709c. In other words, the area within axial buffer portion 756c is about the same as the area of the face 762.

The buffer rod 750 has a predetermined acoustic impedance ($Z_{buffer}$). In the illustrated example, the cavity 760 is filled with air (e.g., an air gap), a fluid (e.g., oil), or a solid having an acoustic impedance that is sufficiently different from the acoustic impedance of the buffer rod 750 to reflect an acoustic echo when struck by an acoustic wave (e.g., an ultrasonic ping). In some embodiments, the cavity 760 is evacuated to form at least a partial vacuum.

In the illustrated example, the axial buffer portion 756a is partly tapered, and is covered by a cladding 770. The taper has a predetermined shape that is configured to improve the efficiency and/or sensitivity of the ultrasonic sensor module 700 by directing the propagation of incident waves. The cladding 770 is configured to improve the efficiency and/or sensitivity of the ultrasonic sensor module 700 by directing the propagation of incident waves, acoustically isolating the buffer rod 750 from the sensor housing 702, and/or thermally insulating the buffer rod 750 from the sensor housing 702. In some embodiments, the taper, the cladding, or both may be omitted. In some embodiments, other portions of the buffer rod 750 may include a cladding.

Referring again to FIG. 7A, the ultrasonic sensor module 700 includes a matching layer 780 acoustically mated with, affixed to, or otherwise abutted to the axial end 752 of the buffer rod 750. In some embodiments, the matching layer 780 may be adhered to the axial end 752. In some embodiments, portions of the matching layer 780 may extend to the sensor housing 702 and be affixed (e.g., welded) to the sensor housing 702. In some embodiments in which the matching layer 780 is affixed to the sensor housing 702, the joint between the matching layer 780 and the sensor housing

702 can substantially seal the axial interior sensor housing cavity 704 from fluid incursion at the axial end 754. The matching layer 780 has an axial thickness that is about a round odd multiple of the transmission wavelength of the acoustic transceiver element 730 (n/4 λ, or (2n−1) λ/4 where n>0), for example 1/4 λ.

FIG. 4 shows a conceptual example of incident wave propagation in the ultrasonic sensor module 700 of FIG. 7A. In use, the acoustic transceiver element 730 is activated to emit an incident wave (e.g., a ping). The incident wave is transmitted into and along the buffer rod 750. A portion of the incident wave, represented by arrow 810, travels until it encounters the face 762. The junction of the face 762 and the cavity 760 causes a portion of the incident wave 810 to be reflected as an echo represented by arrow 820. The echo 820 travels back to be detected by the acoustic transceiver element 730. In some embodiments, the ultrasonic sensor module 700 may include a separate acoustic emitter and receiver for transmission and detection of the incident waves.

Another portion of the incident wave, represented by arrow 830, travels until it encounters the axial end 754. The junction of the axial end and a fluid 801 at the axial end 754 causes a portion of the incident wave 830 to be reflected as an echo represented by arrow 840. The echo 840 travels back to be detected by the acoustic transceiver element 730. Another portion of the incident wave, represented by arrow 850, propagates into the fluid 801 at the axial end 754.

The time between the transmission of the incident wave and detection of the echo 820 is measured (e.g., by the example controller 190 of FIG. 1) to determine a first time of flight. The time between the transmission of the incident wave and detection of the echo 840 is measured to determine a second time of flight. The amplitudes of the echo 820 and the echo 840 are also measured. As will be discussed further in the descriptions of FIGS. 10A-10B, the measured times-of-flight, the measured echo amplitudes, and predetermined information about the acoustic impedance of the buffer rod 750 and predetermined distances between the acoustic transceiver element 730, the face 762, and the axial end 754, can be used to determine properties of the fluid 801 at the axial end 754, such as acoustic impedance ($Z_{fluid}$) and/or speed of sound in the fluid ($C_{fluid}$).

In some implementations, the ultrasonic sensor module 700 can be used in applications other than the USFM system 100. For example, the ultrasonic sensor module 700 can be put into contact with a fluid (e.g., attached to or submerged in a tank, pipe, or other fluid vessel or volume) and can be sonified as part of a process to determine an acoustic impedance of the fluid, a speed of sound in the fluid, and/or a fluid density of the fluid.

In some implementations, characteristics (e.g., physical and/or environmental characteristics, such as sound speed, length, temperature) of the buffer rod 750 itself can be determined based on the measured times-of-flight and/or the measured echo amplitudes (e.g., to calibrate for unknown buffer rod acoustic impedance and/or compensate for the effects of temperature changes on the ultrasonic sensor module 700). Similarly, in some implementations, the distances between the acoustic transceiver element 730 and one or both of the face 762 and/or the axial end 754 can be determined based on the measured times of flight, the measured echo amplitudes, known distances, known buffer rod acoustic impedance, and/or known buffer rod temperature. In some implementations, measured parameters can be used to determine physical and/or environmental parameters, such as sound speed, length, and/or temperature.

Figure 9:
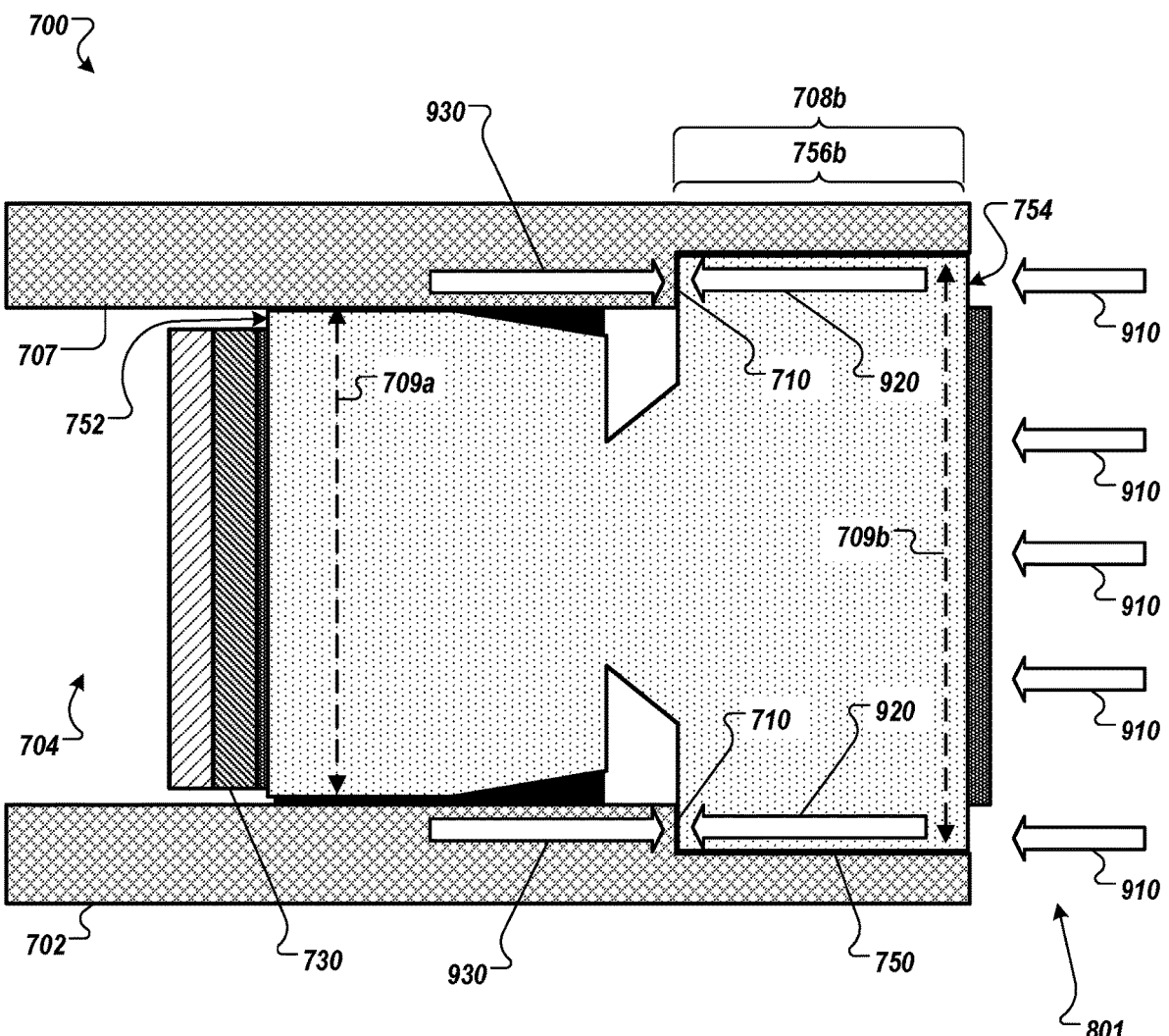
FIG. 9 shows a conceptual example of fluid pressure mitigation in the module of FIG. 7A.

FIG. 9 shows a conceptual example of fluid pressure mitigation in the ultrasonic sensor module 700 of FIG. 7A. In use, the ultrasonic sensor module 700 is at least partly exposed to the fluid 801 at the axial end 754. In some embodiments, the temperature or chemical properties of the fluid 801 can be damaging to the acoustic transceiver element 730, therefore the ultrasonic sensor module 700 is configured to prevent the fluid 801 from coming into direct contact with the acoustic transceiver element 730. For example, direct or indirect (e.g., though a shim, sleeve, cladding, seal, or sealant) contact between the axial buffer portion 756b and the axial sensor housing portion 708b and/or between the buffer rod 750 and the face 710 can substantially block fluid flow from the axial end 754 to the acoustic transceiver element 730. In some implementations, fluid seepage that gets by the buffer rod 750 can be directed to the axial interior sensor housing cavity 704 without contacting a major face of the acoustic transceiver element 730.

In use, the ultrasonic sensor module 700 is at least partly exposed to fluid pressure, represented by arrows 910, at the axial end 754. The fluid pressure 910 is a static fluid pressure relative to the dynamic pressures caused by the acoustic signals used by the acoustic transceiver element 730. In some embodiments, direct or indirect (e.g., through the buffer rod 750) application of the fluid pressure 910 could create a compressive force against the acoustic transceiver element 730 that could offset or otherwise negatively affect signals provided by the acoustic transceiver element 730 in response to sensed acoustic signals. In some implementations, such effects can be compensated for by mathematically by electrically offsetting the sensor signals in order to recover an approximation of the true signal.

The ultrasonic sensor module 700 is configured to prevent the fluid pressure 910 from affecting the acoustic transceiver element 730. For example, the acoustic transceiver element 730 is acoustically mated to the axial end 752. As such, the acoustic transceiver element 730 is able to "float" on the buffer rod 750 relative to the sensor housing 702 and not become compressed by the fluid pressure 910.

The acoustic transceiver element 730 is also protected from the fluid pressure 910 by the mechanical configuration of the buffer rod 750 and the sensor housing 702. Fluid pressure 910 is applied to the axial end 754, which urges movement of the buffer rod 750 into the axial interior sensor housing cavity 704. This pressure that urges such movement is represented by arrows 920. Movement of the buffer rod 750 is prevented by contact between the axial buffer portion 756b and the face 710 of the sensor housing 702, as represented by arrows 930. As such, the force 920 is prevented from reaching the acoustic transceiver element 730.

The smaller size of the cross-sectional area 709a is sized to accommodate acoustic transceiver element 730 and decouple thermal expansion of the sensor housing 702 from the acoustic path. The larger size of the cross-sectional area 709b is sized to accommodate the pressure-induced forces acting on the buffer rod 750. The transmission of forces into the sensor housing 702 substantially eliminates pressure-induced forces from acting on the acoustic transceiver element 730, substantially eliminating the need for pressure compensation, transducer components that are sized to react pressure-induced forces, and/or wetted transducer design constraints.

By decoupling the acoustic transceiver element 730 from the fluid pressure environment, several advantages are observed. For example, fluid/fuel compatibility of the acous-tic transceiver element 730 is not required. In another example, the acoustic transceiver element 730 frequency is not restricted by thickness requirements driven by pressure-induced forces. In another example in which the acoustic transceiver element 730 is a piezo transducer, the piezo thickness required to support fluid pressure puts the operating frequency of the acoustic transceiver element 730 far below operating requirements of time of flight measurement. In yet another example, the operational frequency of the acoustic transceiver element 730 can be sized to improve acoustic optimization and/or low flow measurement accuracy.

Figure 10A:
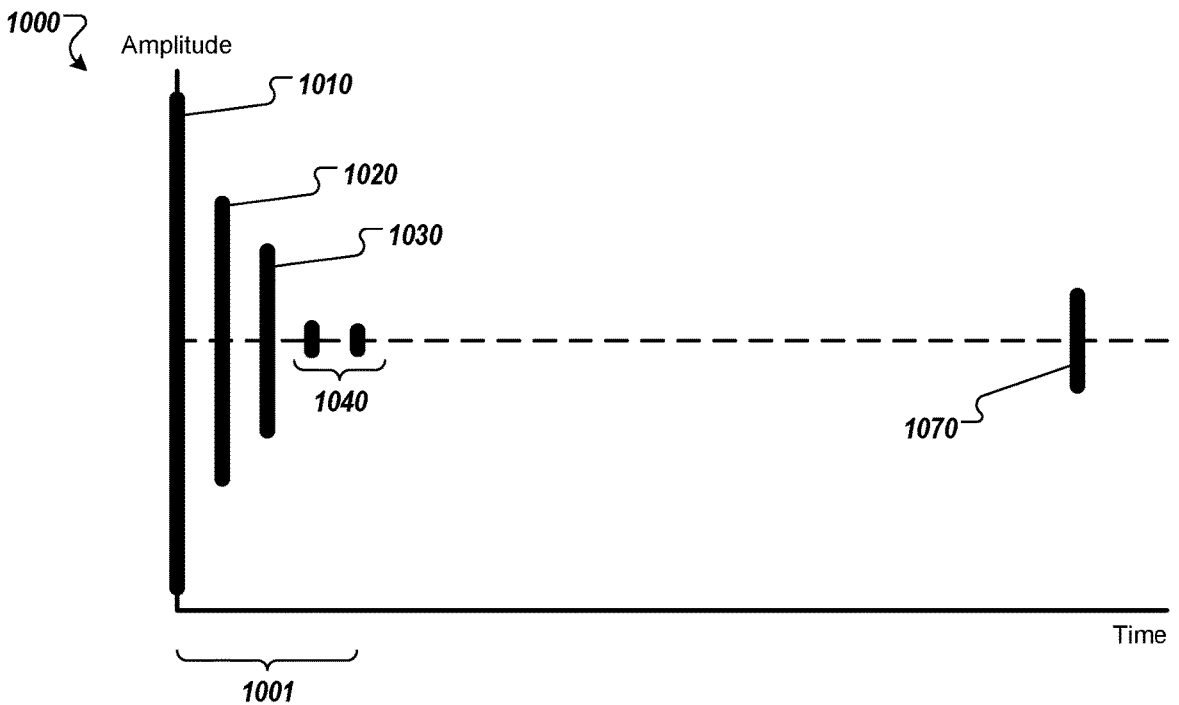
FIGS. 10A and 10B are graphs that show example incident waves and echoes in the ultrasonic flow measurement system of FIG. 7A.
Figure 10B:
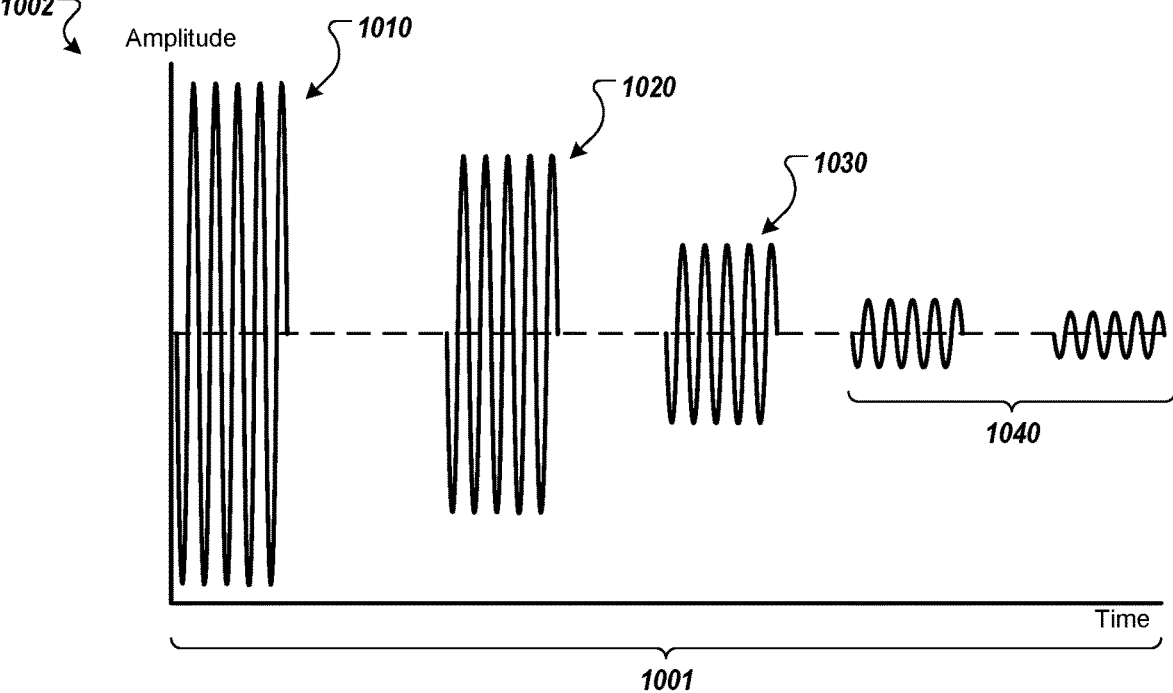

FIGS. 10A and 10B are graphs that show example incident waves and echoes in the ultrasonic flow measurement system of FIG. 1. For example, the incident waves and echoes may be emitted and/or detected by one or more of the example TOF transducers 180a-180b, and/or the example AIS modules 102a-102c. FIG. 10A shows a graph 1000 of acoustic amplitude over time, including a sub-duration 1001. FIG. 10B shows a graph 1002 in which the sub-duration 1001 has been expanded for visibility.

The graph 1000 shows a representation of the emission of an initial incident wave 1010 (e.g., when the acoustic transceiver element 730 is activated to send an acoustic "ping"). An echo 1020 is received a few milliseconds later. In some implementations, the echo 1020 can be the echo 820 of FIG. 8, which is a reflection of a portion of the incident wave 810 off the face 762 of the cavity 760.

An echo 1030 is received a few milliseconds later. In some implementations, the echo 1030 can be the echo 840, which is a reflection of a portion of the incident wave 830 off the axial end 754, which is also an interface to the fluid. Echoes 1040 represent reverberations in the buffer rod 750. In operation, the echoes 1040 can be filtered out or otherwise ignored.

An incident wave 1070 represents a portion of the incident wave that is received by an acoustic sensor (e.g., the acoustic transceiver element 730 located downstream or otherwise opposite the acoustic transceiver element 730 that transmitted the incident wave). The amount of time taken by the incident wave 1070 to arrive is affected by several variables, such as the fluid density, flow rate, and flow direction of the fluid in the fluid control conduit 130, and the distance 150. The amount of time taken for the incident wave 1070 can be used as $t_{up}$ or $t_{down}$ (e.g., depending on whether the wave travelled upstream or downstream in the fluid control conduit 130). For example, tup can represent the time of flight from the example TOF sensor 180b to the example TOF sensor 180a, and $t_{down}$ can represent the time of flight from the example TOF sensor 180a to the example TOF sensor 180b. In some embodiments of the example AIS modules 102a-102c, the incident wave 1070 may represent a reflection from the housing cavity wall opposite the AIS module. In some implementations, such an incident wave could be used for to determine fluid properties such as sound speed.

As illustrated in FIG. 9, the buffer rod 750 is designed to transfer pressure-induced forces to the face 710 of the sensor housing 702. This is achieved through the double diameter construction of the buffer rod 750, where the smaller cross-sectional area is sized to accommodate the acoustic transceiver element 730 and decouple thermal expansion of the sensor housing 702 from the acoustic path. The larger cross-sectional area of the axial buffer portion 756b is sized to accommodate the pressure-induced forces acting on the buffer rod 750. The transmission of forces into the sensor housing 702 substantially eliminates pressure-induced forces from acting on the acoustic transceiver element 730 and substantially eliminates the need for (e.g., piezo ceramic) pressure compensation, sizing to react the pressure induced forces, and substantially avoids wetted transducer design constraints.

By decoupling the acoustic transceiver element 730 from the fluid pressure environment, several advantages are observed. For example, fluid/fuel compatibility of the acoustic transceiver element 730 is not required, the acoustic transceiver element 730 frequency is not restricted by thickness requirements driven by pressure induced forces, the thickness of the acoustic transceiver element 730 required to support fluid pressure puts operating frequency far below operating requirements of time of flight measurement, and acoustic transducer frequency can be sized for acoustic optimization and low flow measurement accuracy.

For aircraft turbine fuel systems, mass fuel flow rate can be determined for an understanding of combustion energy content. This is solved through the use of the buffer rod 750. The internal design of the buffer rod 750 enables additional acoustic benefits which can be intentionally designed into the USFM system 100. For example, the configuration of the buffer rod 750 enables the controller 190 to determine reflection coefficients for fuel acoustic impedance measurement. This is achieved by introducing a transducer transmit amplitude response (e.g., echoes 820 or 1020), achieved with the cavity 760 which acts as a substantially ideal reflector, and this amplitude can be compared to the return echoes of the buffer rod fluid interface (e.g., echoes 840 or 1030). In some embodiments, the sensitivity of the axial end 754 is further enhanced by the matching layer 780, however, this will be ignored in order to simplify the equations below.

Fluid acoustic impedance can be determined by setting echo reflection effective areas equal to one another, for example by configuring the cross-sectional areas 709$a$ and 709$c$ appropriately. In some implementations, the areas can be non-equal, and a mathematical compensation can be integrated into the process. However, for the sake of clarity, the areas are assumed to be equal in the equations below. This allows for direct measurement of the reflection coefficient. The wave propagation within the buffer rod 750 is articulated such that in air, the echo returned from the face 762 is equivalent to the echo from the axial end 754.

The reflection coefficient is found through the use of short time Fourier transforms (STFT). The fast Fourier transforms (FFT) of the two echoes are found to determine the peak of the return echoes:

$$STFT \rightarrow Amplitude = f(Frequency)$$

Therefore:

$$|A| = |FFT(Echo_1)||_{f=f_0}$$

$$|B| = |FFT(Echo_2)||_{f=f_0}$$

Figure 8:
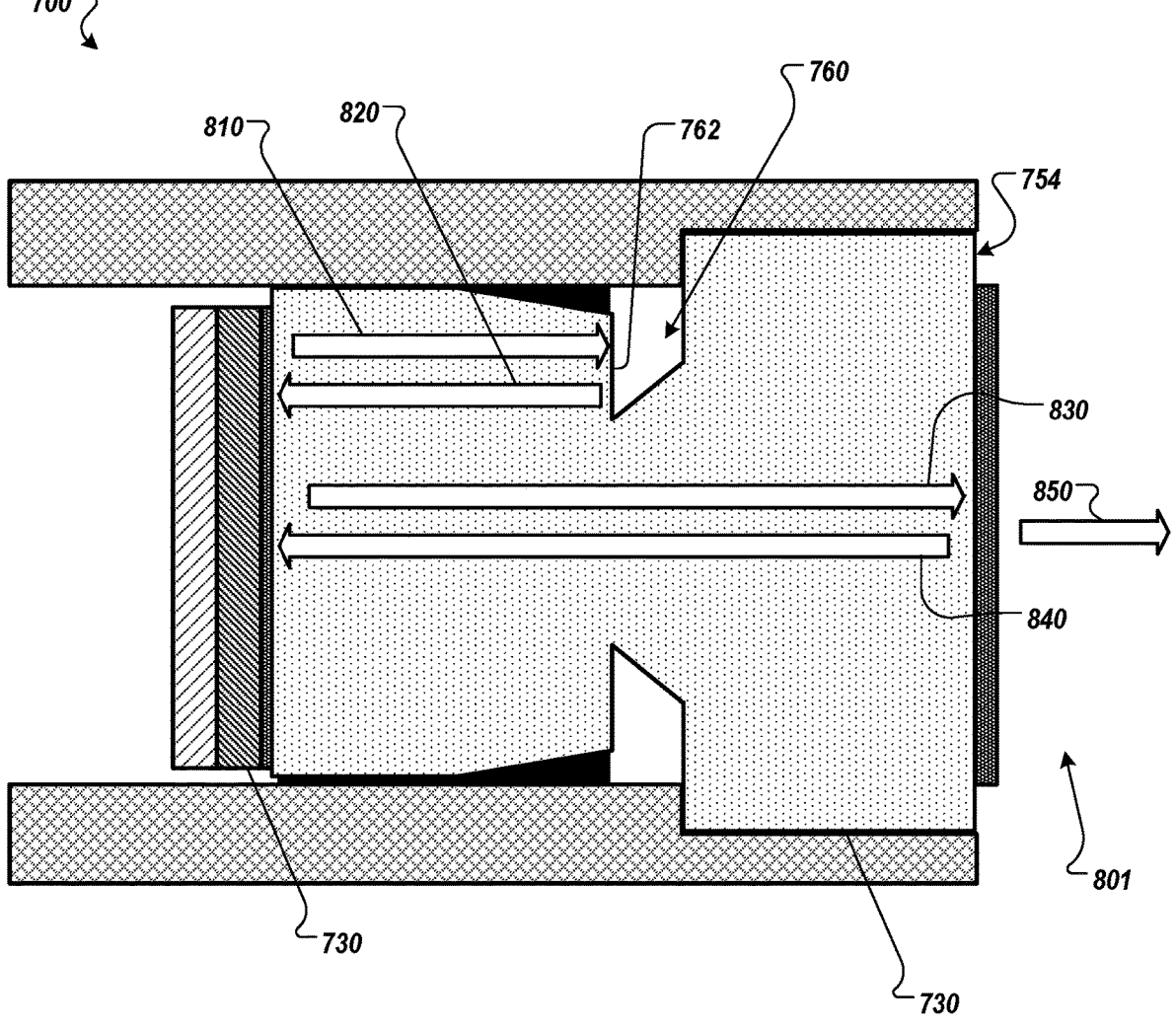
FIG. 8 shows a conceptual example of incident wave propagation in the module of FIG. 7A.

Where:

Echo$_1$ is one of the echoes 820 or 1020 of FIGS. 8 and 10 respectively, Echo$_2$ is one of the echoes 840 or 1030 of FIGS. 8 and 10 respectively, and f and f$_0$ are the transducer driving frequency. The reflection coefficient is then found from:

$$R = \frac{|B|}{|A|}$$

And, assuming the buffer rod 750 is in direct interface with the fluid or fuel (e.g., no matching layer 780 in this case):

$$R = \frac{|Z_2 - Z_1|}{|Z_2 + Z_1|}$$

Where R is the reflection coefficient.

$$Z_2 = Z_{fluid}$$

$$Z_1 = Z_{buffer}$$

$$Z_{fluid} = \frac{Z_{buffer}(1 - R)}{1 + R}$$

The impedance of the buffer rod 750 can be determined through characterization at the sensor level. With the buffer rod impedance known and the reflection coefficient being measured, the fluid impedance can now be solved for:

$$Z_{fluid} = \rho_{fluid} C_{fluid}$$

From the equations above, a speed of sound in fluid can be solved. Since fluid impedance and fluid sound speed are known, fluid density can now be solved:

$$\rho_{fluid} = \frac{Z_{fluid}}{C_{fluid}}$$

Explicitly:

$$\rho_{fluid} = \frac{\left(\dfrac{Z_{buffer}(1 - R))}{1 + R}\right)}{\left(\dfrac{L(t_{up} + t_{down})}{2t_{up}t_{down}}\right)}$$

With volumetric fluid flow and density now known, the mass fluid flow rate can be found:

$$\dot{m}_{fluid} = Q_{fluid}\rho_{fluid} = C_d A V_{fluid}\frac{Z_{fluid}}{C_{fluid}}$$

Figure 11:
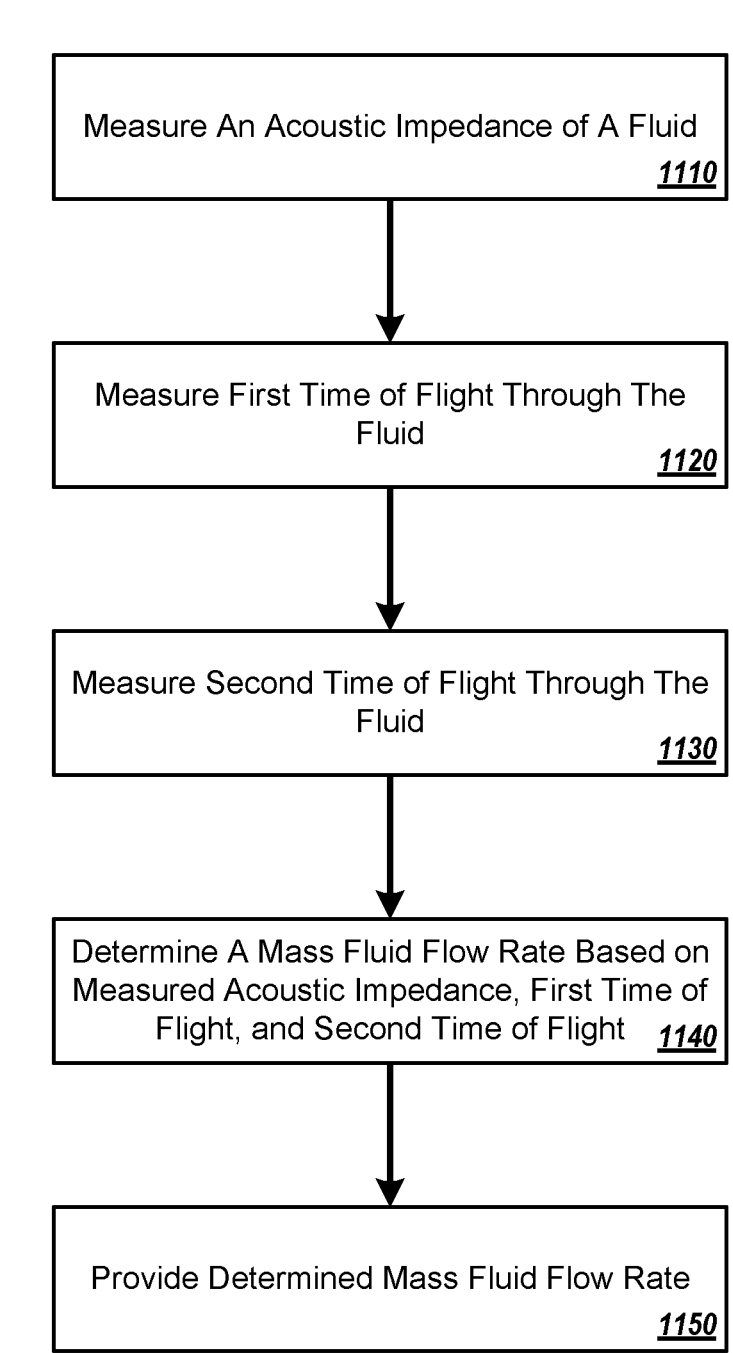
FIG. 11 is a flow chart of an example process for determining a mass fluid flow rate.

FIG. 11 is a flow chart of an example process 1100 for determining a mass fluid flow rate. In some implementations, the process 1100 can be performed by all or part of the example USFM system 100 of FIG. 1.

At 1110, an acoustic impedance of a fluid is measured. For example, one or more of the example AIS modules 102$a$-102$c$ of FIG. 1 could be controlled by the controller 190 to sense an acoustic impedance of fluid in the USFM system 100 and provide sensor signals back to the controller 190 for analysis and transformation into acoustic impedance measurement data.

At 1120, a first time of flight in a first direction through the fluid is measured. For example, the controller 190 can cause the example TOF transducer 180$a$ to send an acoustic signal to the example TOF transducer 180$b$ through fluid in the fluid control conduit 130, and the controller 190 can use acoustic sensor information from the TOF transducer 180$b$ to determine a time of flight from the TOF transducer 180$a$ to the TOF transducer 180$b$ (e.g., a downstream TOF in a moving fluid).

At 1130, a second time of flight in a second direction through the fluid is measured. For example, the controller 190 can cause the example TOF transducer 180*b* to send an acoustic signal to the example TOF transducer 180*a* through fluid in the fluid control conduit 130, and the controller 190 can use acoustic sensor information from the TOF transducer 180*a* to determine a time of flight from the TOF transducer 180*b* to the TOF transducer 180*a* (e.g., an upstream TOF in the moving fluid).

At 1140, a mass fluid flow rate is determined based on the measured acoustic impedance, the measured first time of flight, and the measured second time of flight. For example, as discussed above, a measured downstream TOF and a measured upstream TOF can be compared (e.g., by the controller 190) to determine a fluid flow velocity, and a measured acoustic impedance of the fluid can be mathematically combined with the fluid flow velocity to determine a mass fluid flow rate of the moving fluid. In some implementations, the mass fluid flow rate can be given by the equation:

$$\dot{m}_{fluid} = \left(\frac{V_{fluid}}{C_{fluid}}\right) \times C_d \times A \times Z_{fluid} = \left(\frac{t_{up} - t_{dn}}{t_{up} + t_{dn}}\right) \times C_d \times A \times Z_{fluid}.$$

At 1150, the determined mass fluid flow rate is provided. For example, the controller 190 can provide the determined mass fluid flow rate to an operator for manual analysis and/or action. In another example, the controller 190 can provide the determined mass fluid flow rate as an input to an automated process (e.g., a pump that controls the fluid flow rate, an engine controller that can adjust based on a mass flow of fuel).

In some implementations, measuring the acoustic impedance of a fluid can include activating an emitter to emit at least a first incident wave in a first direction and emit a second incident wave in a second direction opposite the first direction, transmitting the first incident wave along a first buffer rod having a first axial end abutted to the emitter and a second axial end opposite the first axial end, transmitting the second incident wave along a second buffer rod having a third axial end abutted to the emitter and a fourth axial end opposite the third axial end and abutted to the fluid, reflecting a first echo of the first incident wave by an acoustic reflector defined along a portion of the second axial end, detecting, by a sensor, the first echo, determining a first amplitude of the first echo, reflecting a second echo of the second incident wave by the fourth axial end, detecting, by the sensor, the second echo, determining a second amplitude of the second echo, and determining a reflection coefficient based on the first amplitude and the second amplitude. For example, the example ultrasonic sensor module 200 is configured to determine an impedance of a fluid at the axial end 254 based on the example echoes 320 and 340.

In some implementations, measuring the acoustic impedance of a fluid can include activating an emitter to emit at least one incident wave, transmitting the incident wave along a buffer rod having a first axial end abutted to the emitter and a second axial end opposite the first axial end, reflecting a first echo of the incident wave by a gap defined along a portion of the buffer rod, detecting, by a sensor, the first echo, determining a first amplitude of the first echo, reflecting a second echo of the incident wave by the second axial end, detecting the second echo, determining a second amplitude of the second echo, and determining a reflection coefficient based on the first amplitude and the second amplitude. For example, the example ultrasonic sensor module 700 is configured to determine an impedance of a fluid at the axial end 754 based on the example echoes 820 and 840.

In some implementations, one or both of the emitter and the sensor can be piezo elements. In some implementations, a piezo element comprises the emitter and the sensor. For example, the ultrasonic sensor module 200 includes the acoustic transceiver element 230 that can be configured to transmit and/or detect acoustic vibrations, and in some examples the acoustic transceiver element 230 can be a piezo element. In another example, the ultrasonic sensor module 700 includes the acoustic transceiver element 730 that can be configured to transmit and/or detect acoustic vibrations, and in some examples the acoustic transceiver element 730 can be a piezo element.

In some embodiments, the acoustic reflector can include a matching layer affixed to the second axial end and having a thickness of $(2n-1)$ $\lambda/4$, where $n>0$. For example, the ultrasonic sensor module 200 can include the matching layer 280. In another example, the ultrasonic sensor module 700 can include the matching layer 780.

In some implementations, the fourth axial end can be abutted to a gas or an at least partial vacuum. For example, the axial end 274 of the example ultrasonic sensor module 200 can be exposed to a gas or an at least partial vacuum in the cavity 204.

Figure 12:
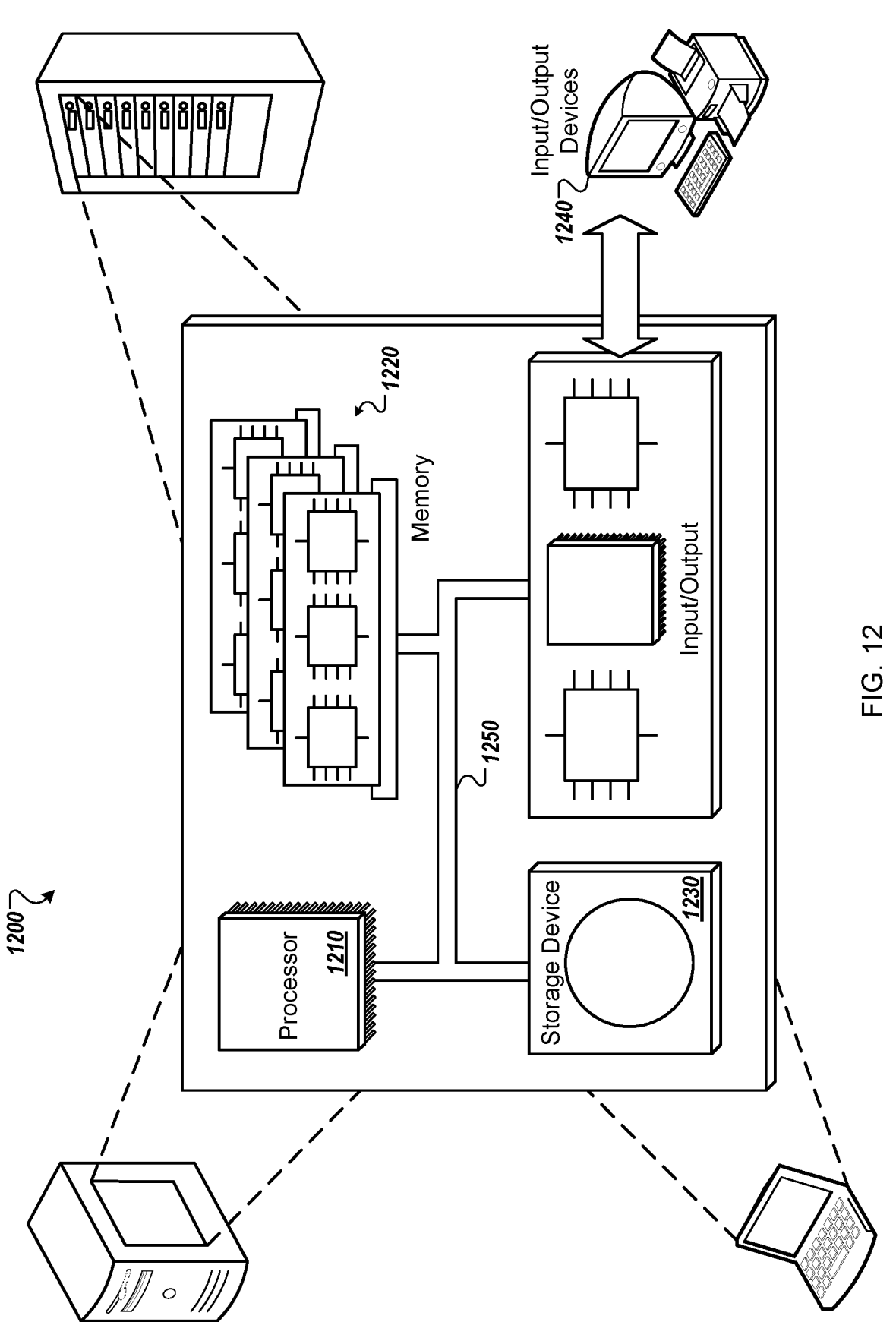
FIG. 12 is a schematic diagram of an example of a generic computer system.

FIG. 12 is a schematic diagram of an example of a generic computer system 1200. The system 1200 can be used for the operations described in association with the process 1100 according to one implementation. For example, the system 1200 may be included in the controller 190.

The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mass flow sensor system comprising:
   a fluid housing defining a fluid flow conduit and comprising:
      a first fluid housing portion defining a first axial fluid housing cavity and comprising a first fluid port in fluidic communication with the first axial fluid housing cavity;
      a second fluid housing portion defining a second axial fluid housing cavity and comprising a second fluid port in fluidic communication with the second axial fluid housing cavity; and
      a tubular fluid conduit in fluidic communication with the first fluid port at a first end and in fluidic communication with the second fluid port at a second end opposite the first end, and defining a conduit axis;
   a first transceiver element arranged within the first axial fluid housing cavity, axially aligned with the conduit axis;
   a second transceiver element arranged within the second axial fluid housing cavity, axially aligned with the conduit axis; and
   a fluid acoustic impedance sensor arranged in fluidic communication with the fluid flow conduit;
   wherein the fluid acoustic impedance sensor comprises:
   a sensor housing having an interior surface defining a sensor axis and an axial interior sensor housing cavity comprising:
   a first axial sensor housing portion having a first cross-sectional area perpendicular to the sensor axis;
   a second axial sensor housing portion arranged adjacent to the first axial sensor housing portion along the sensor axis and having a second cross-sectional area larger than the first cross-sectional area perpendicular to the sensor axis; and
   a sensor housing face extending from the interior surface of the first axial sensor housing portion to the interior surface of the second axial sensor housing portion;
   a first axial buffer rod arranged within the first axial sensor housing portion and comprising a first axial end and a second axial end;
   a second axial buffer rod arranged within the second axial sensor housing portion and
   abutting the sensor housing face, and comprising a third axial end and a fourth axial end; and
   an acoustic transceiver element acoustically mated to the second axial end and the third axial end.

2. The mass flow sensor system of claim 1, further comprising circuitry configured to:
   activate the first transceiver element to emit a first incident wave though a fluid in the tubular fluid conduit;
   activate the second transceiver element to emit a second incident wave through the fluid in the tubular fluid conduit;
   measure, by the fluid acoustic impedance sensor, an acoustic impedance of the fluid;
   detect, by the second transceiver element, at least a first portion of the first incident wave;
   determine a first time of flight of the first portion;
   detect, by the first transceiver element, at least a second portion of the second incident wave;

determine a second time of flight of the second portion; and determine a mass fluid flow rate based on the measured acoustic impedance, the determined first time of flight, and the determined second time of flight.

3. The mass flow sensor system of claim 2, further comprising:

activating, by the circuitry, the acoustic transceiver element of the fluid acoustic impedance sensor to emit an acoustic incident wave;

detecting, by the acoustic transceiver element, a first acoustic echo of the acoustic incident wave;

detecting, by the acoustic transceiver element, a second acoustic echo of the acoustic incident wave; and comparing, by the circuitry, the first acoustic echo and the second acoustic echo to determine the acoustic impedance of the fluid.

4. The mass flow sensor system of claim 1, wherein the acoustic transceiver element is configured to emit a vibration having a predetermined wavelength ($\lambda$), and the first axial buffer rod and the second axial buffer rod both have axial lengths of about a round multiple of n/2 $\lambda$ wherein n represents a natural number.

5. The mass flow sensor system of claim 1, wherein the acoustic transceiver element comprises a piezo element.

6. The mass flow sensor system of claim 1, further comprising a matching layer affixed to the fourth axial end and having a thickness of about an odd multiple of 1/4 $\lambda$, wherein $\lambda$ represents a predetermined wavelength.

7. The mass flow sensor system of claim 1, wherein the first axial end defines an acoustic reflector.

8. The mass flow sensor system of claim 1, wherein the first axial end is abutted to a gas or an at least partial vacuum.

9. A method of sensing, comprising:

measuring an acoustic impedance of a fluid;

measuring a first time of flight in a first direction through the fluid;

measuring a second time of flight in a second direction through the fluid;

determining a mass fluid flow rate based on the measured acoustic impedance, the measured first time of flight, and the measured second time of flight;

providing the determined mass fluid flow rate;

activating an emitter to emit at least a first incident wave in a first direction and emit a second incident wave in a second direction opposite the first direction;

transmitting the first incident wave along a first buffer rod having a first axial end abutted to the emitter and a second axial end opposite the first axial end;

transmitting the second incident wave along a second buffer rod having a third axial end abutted to the emitter and a fourth axial end opposite the third axial end and abutted to the fluid;

reflecting a first echo of the first incident wave by an acoustic reflector defined along a portion of the second axial end;

detecting, by a sensor, the first echo; determining a first amplitude of the first echo;

reflecting a second echo of the second incident wave by the fourth axial end;

detecting, by the sensor, the second echo;

determining a second amplitude of the second echo; and determining a reflection coefficient based on the first amplitude and the second amplitude.

10. The method of claim 9, wherein one or both of the emitter and the sensor are piezo elements.

11. The method of claim 9, wherein a piezo element comprises the emitter and the sensor.

12. The method of claim 9, wherein the acoustic reflector comprises a matching layer affixed to the second axial end and having a thickness of about $(2n-1)\lambda/4$, where $n>0$ and $\lambda$ represents a predetermined wavelength.

13. The method of claim 9, wherein the fourth axial end is abutted to a gas or an at least partial vacuum.

14. The method of claim 9, wherein the mass fluid flow rate is given by the equation:

$$\dot{m}_{fluid} = \left(\frac{V_{fluid}}{C_{fluid}}\right) \times C_d \times A \times Z_{fluid} = \left(\frac{t_{up} - t_{dn}}{t_{up} + t_{dn}}\right) \times C_d \times A \times Z_{fluid},$$

wherein:

$C_{fluid}$=speed of sound in a fluid;

$V_{fluid}$=velocity of the fluid;

$Z_{fluid}$=an acoustic impedance of the fluid;

$C_d$=a predetermined discharge coefficient of the fluid;

A=a cross section area of the fluid;

$t_{up}$=upstream transit time; and $t_{dn}$=downstream transit time.

* * * * *